United States Patent
Wainer et al.

(10) Patent No.: US 7,009,183 B2
(45) Date of Patent: Mar. 7, 2006

(54) PIXELATED PHOTON DETECTOR

(75) Inventors: Naor Wainer, Zichron-Yaakov (IL); Yaron Hefetz, Herzelia (IL); Aharon Amrami, Yokneam (IL); Amir Pansky, Atlit (IL)

(73) Assignee: Elgems Ltd., Tirat-Hacarmel (IL)

(*) Notice: Subject to any disclaimer, the term of this patent is extended or adjusted under 35 U.S.C. 154(b) by 0 days.

(21) Appl. No.: 10/809,085

(22) Filed: Mar. 25, 2004

(65) Prior Publication Data
US 2004/0178348 A1   Sep. 16, 2004

Related U.S. Application Data

(62) Division of application No. 10/465,075, filed on Jun. 19, 2003, now Pat. No. 6,740,885, which is a division of application No. 09/806,084, filed as application No. PCT/IL98/00462 on Sep. 24, 1998, now Pat. No. 6,621,084.

(51) Int. Cl.
G01T 1/172   (2006.01)
(52) U.S. Cl. .............................. 250/370.09; 250/370.1
(58) Field of Classification Search .......... 250/370.09, 250/370.01, 370.06, 370.07, 370.1, 370.13, 250/338.4, 372, 330, 332, 339.04, 339.14, 250/339.15
See application file for complete search history.

(56) References Cited

U.S. PATENT DOCUMENTS

| 4,210,805 A | 7/1980 | Kobayashi et al. |
|---|---|---|
| 4,755,676 A | 7/1988 | Gaalema et al. |
| 4,845,731 A * | 7/1989 | Vidmar et al. ................. 378/98 |
| 5,500,534 A | 3/1996 | Robinson et al. |
| 5,677,539 A | 10/1997 | Apotovsky et al. |
| 5,777,338 A | 7/1998 | He |

(Continued)

FOREIGN PATENT DOCUMENTS

CH   471 392   4/1969

(Continued)

OTHER PUBLICATIONS

He, Z. et al.; "Coplanar Grid Patterns and Their Effect on Energy Resolution of CdZnTe Detectors;" IEEE Nuclear Science Symposium and Medical Imaging Conference; Albuquerque, Mexico; Nov. 9-15, 1997.

(Continued)

Primary Examiner—Otilia Gabor
(74) Attorney, Agent, or Firm—Fenster & Company

(57)   ABSTRACT

A gamma camera comprising:

a plurality of pixelated detectors wherein each pixelated detector provides a detector signal responsive to photons that are incident on it;

a plurality of processing circuits that receive said detector signals and provide processed signals responsive to said detector signals; and at least one printed circuit board on which said processing circuits are mounted and having conductors thereon that carry said detector signals to said processing circuits;

wherein said processing circuits are mounted on said printed circuit board at locations remote from said detectors; and wherein said plurality of pixelated detectors form a two-dimensional planar array.

27 Claims, 13 Drawing Sheets

U.S. PATENT DOCUMENTS

| | | | |
|---|---|---|---|
| 5,821,539 A | 10/1998 | Matz et al. | |
| 5,886,353 A * | 3/1999 | Spivey et al. | 250/370.09 |
| 6,034,373 A | 3/2000 | Shahar et al. | |
| 6,169,287 B1 | 1/2001 | Warburton | |
| 6,255,650 B1 * | 7/2001 | Warner et al. | 250/330 |
| 6,333,504 B1 | 12/2001 | Lingren et al. | |
| 6,365,900 B1 * | 4/2002 | Mestais et al. | 250/363.1 |
| 6,465,790 B1 * | 10/2002 | Monnet et al. | 250/370.09 |
| 6,559,447 B1 * | 5/2003 | Wood | 250/332 |
| 6,583,420 B1 | 6/2003 | Nelson et al. | |
| 2002/0079456 A1 | 6/2002 | Lingren et al. | |
| 2003/0081128 A1 * | 5/2003 | Kirmuss | 348/207.99 |

FOREIGN PATENT DOCUMENTS

| | | |
|---|---|---|
| DE | 196 16 545 | 10/1997 |
| EP | 0 291 351 | 11/1988 |
| EP | 0 527 373 | 2/1993 |
| FR | 2 705 791 | 12/1994 |
| GB | 2 017 295 | 10/1979 |
| WO | WO 98/23974 | 6/1998 |

OTHER PUBLICATIONS

Naoaki, I.; JP 02-163691 A; Jun. 22, 1990 & Patent Abstracts of Japan; vol. 014; No. 422 (P-1104); Sep. 12, 1990.

Naoaki, I.; JP 05-333157 A; Dec. 17, 1993 & Patent Abstracts of Japan; vol. 018; No. 162 (P-1712); Mar. 17, 1994.

Naoki, S.; JP 59-132382; Jul. 30, 1984 & Patent Abstracts of Japan; vol. 008; No. 265 (P-318); Dec. 5, 1984.

* cited by examiner

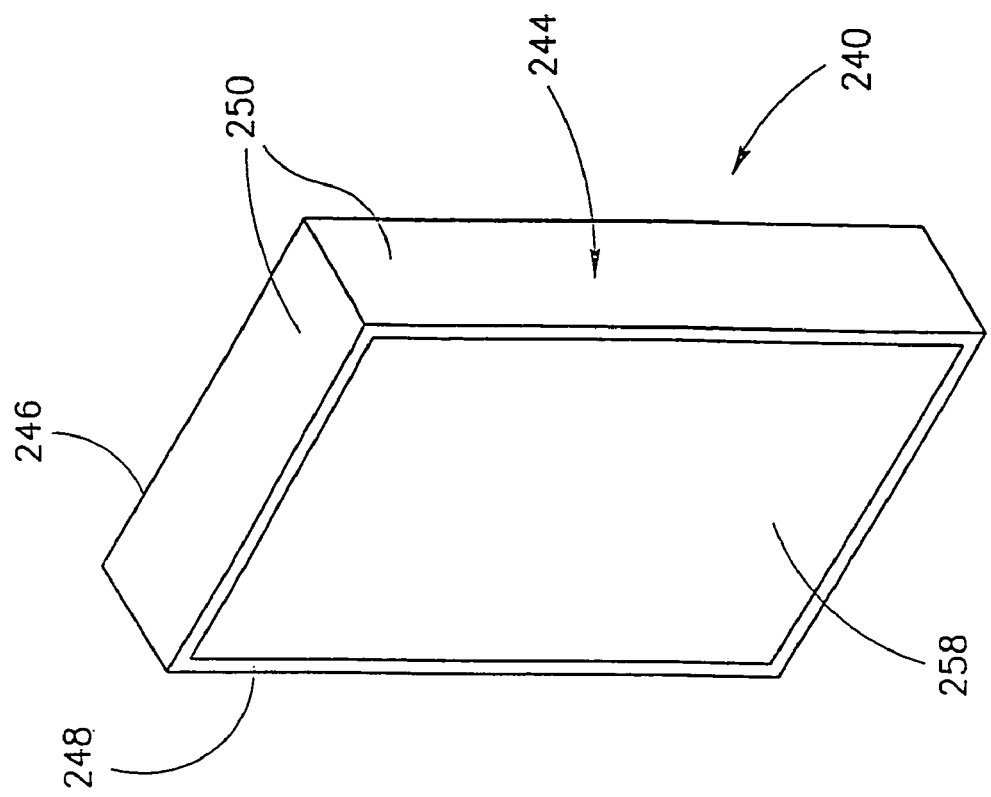
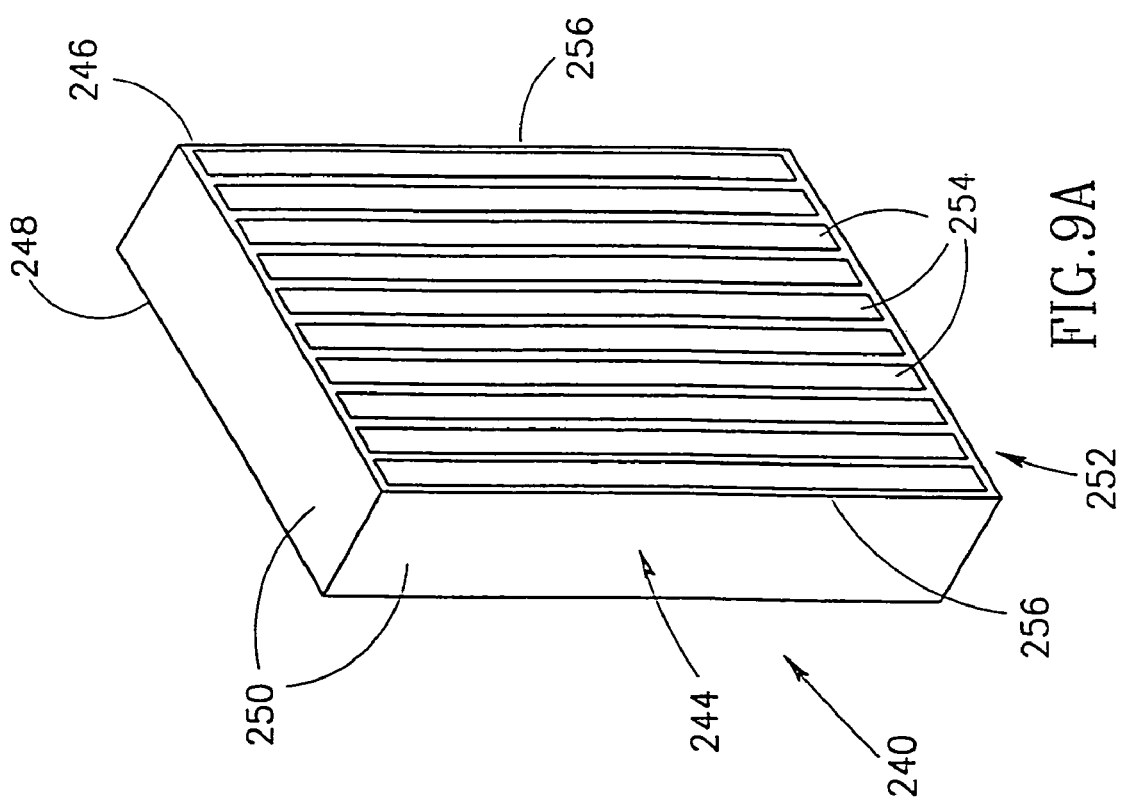
FIG.9B
FIG.9A

PIXELATED PHOTON DETECTOR

RELATED APPLICATIONS

The present application is a divisional application of U.S. application Ser. No. 10/465,075, filed on Jun. 19, 2003 now U.S. Pat. No. 6,740,885 which is a divisional application of U.S. application Ser. No. 09/806,084, filed on Jun. 22, 2001, now U.S. Pat. No. 6,621,084 which is a U.S. national application of PCT Application No. PCT/IL98/00462, filed on Sep. 24, 1998. The disclosures of all of these applications are incorporated herein by reference.

FIELD OF THE INVENTION

The invention relates to solid state photon detectors and in particular to the timing and energy resolution of pixelated photon detectors.

BACKGROUND OF THE INVENTION

Single photon emission computerized tomography (SPECT) and positron emission tomography (PET) depend upon the detection of gamma ray photons emitted by, or generated as a result of, radio-pharmacological compounds introduced into the body to image regions of the body. Photon detectors used in SPECT and PET imaging systems that provide data from the emitted photons in order to produce images provide a spatial location at which a photon is detected and generally a measure of the energy of the detected photon. In PET imaging two photons are detected in coincidence and in addition to providing a spatial location for a detected photon, photon detectors also provide an indication of the time at which they detect a photon.

Traditional photon detectors for PET, SPECT and other applications, generally use an NaI(Tl) or BGO scintillation crystal to detect photons. However, NaI(Tl) has a relatively low density and low stopping power per gram of material. In order to provide detectors having good detection efficiencies for photons, NaI(Tl) crystals used in these detectors must be made relatively thick. However, as the thickness of a detector crystal increases, generally, the spatial resolution of the detector decreases. BGO scintillation crystals on the other hand exhibit low light output for detected photons and therefore generally poor energy resolution Furthermore, scintillation light in both NaI(Tl) and BGO crystals caused by the passage of a photon through the crystal lasts for a relatively long time. This complicates accurate coincidence timing using these detectors.

Semiconductor materials with high atomic numbers and relatively high densities such as CdZnTe, CdTe, $HgI_2$, InSb, Ge, GaAs, Si, PbCs, PbS, or GaAlAs, have a high stopping power for photons per centimeter path length in the semiconductor material. Therefore, for the same stopping power, crystals made from these materials are generally thinner than detector crystals made from other materials that are used for photon detectors. These materials if they are formed into crystals of sufficient thickness can therefore be used to provide detectors with good photon detection efficiencies and improved spatial resolution. However, it difficult to manufacture thick semiconductor crystals for photon detectors using present state of the art technology.

Gamma cameras for detecting photons for SPECT, PET and other applications requiring photon detection and location, have been fabricated from the semiconductor materials listed above. Often these gamma cameras comprise arrays of pixelated detector modules, hereinafter referred to as "pixelated detectors". A pixelated detector is described in PCT publication WO 98/23974, the disclosure of which is incorporated herein by reference.

FIGS. 1A and 1B schematically illustrate a pixelated detector and a gamma camera comprising pixelated detectors respectively. FIG. 1A shows a typical construction of a pixelated detector 20 comprising a crystal 22 formed from a semiconductor material such as one of those noted above. A face 24 of crystal 22 has a large single cathode electrode 26. An opposite face 28 of crystal 22 has an anode 30 comprising a rectangular array of identical small square anode pixels 32. Typically, sizes of anode pixels 32 vary between 1 and 4 $mm^2$, and the thickness of crystal 22, between anode 30 and cathode 26 is on the order of millimeters to a centimeter. In operation, a voltage difference is applied between anode and cathode so that an electric field, hereinafter referred to as a "detector field", is generated in crystal 22. This field is typically on the order of a few kilovolts per centimeter.

When a photon having an energy typical of the energies of photons used in SPECT or PET applications is incident on crystal 22, it generally loses all its energy in crystal 22 by ionization and leaves pairs of mobile electrons and holes in a small localized region of crystal 22. As a result of the detector field, the holes drift to cathode 26 and the electrons drift to anode 30, thereby inducing charges on anode pixels 32 and cathode 26. The induced charges on anode pixels 32 are sensed and generally partially processed by appropriate electronic circuits comprised in ASICs (not shown) located in a detector base 34 on which detector 20 is mounted. Detector base 34 comprises connection pins 36 for mounting to a motherboard (not shown) and transmitting signals from the ASICs to the motherboard. Signals from the induced charges on pixels 32 are used to determine the time at which a photon is detected, how much energy the detected photon deposited in the crystal and where in the crystal the photon interaction took place.

FIG. 1B shows a rectangular gamma camera 38 comprising twenty pixelated detectors 20 arranged to form a rectangular array of five rows of four detectors 20 each. Detectors 20 are shown mounted on a motherboard 39. In practice, gamma cameras comprising larger arrays of pixelated detectors are generally used.

Pixelated detectors provide reasonable spatial resolution and detection efficiency for incident photons. However, signals from anode pixels of a pixelated detector of this type are highly variable in shape and exhibit considerable jitter in signal timing with respect to the time that detected photons are incident on the detector. As a result, for applications such as PET, which require accurate coincidence measurements between different detectors, output signals from anode pixels are not readily useable. Furthermore, pixelated detectors do not provide highly accurate measurements of energies of detected photons such as are required in SPECT, PET and other applications.

The energy of a photon detected by a semiconductor detector is generally determined from an estimate of the total number of electron-hole pairs produced in the detector's crystal when the photon ionizes material of the crystal. This is generally determined from the number of electrons produced in the ionizing event, which is estimated from the charge collected on the anode of the detector. The energy resolution of the detector is a function of how accurately the number of electron-hole pairs produced in the detector by a detected photon can be estimated.

If all the electrons and holes produced by a photon detected in a semiconductor detector were collected by the detector electrodes, then the induced charge on either the anode or cathode of the detector would be an appropriate measure of the energy of the photon. However, the holes are generally subject to relatively severe charge trapping problems in the detector crystal and they drift in the crystal at approximately one tenth the velocity of the electrons. Charge trapping and the slow drift velocity of the holes degrade the accuracy with which the induced charges on either the cathode or anode of a semiconductor detector can be used to estimate the energy of a detected photon.

Semiconductor photon detectors with improved energy resolution that do not detect the location of detected photons, but only their energies, are described in "Unipolar Charge Sensing with Coplanar Electrodes—Application to Semiconductor Detectors," by P. N. Luke, IEEE Transaction on Nuclear Science, vol. 42(4), 1995, p. 207, and in "Coplanar Grid Patterns and Their Effect on Energy Resolution of CdZnTe Detectors" by Z. He, et al, presented at the 1997 IEEE Nuclear Science Symposium and Medical Imaging Conference, Albuquerque, N. Mex., Nov. 9–15, 1997, which are incorporated herein by reference. For the described detectors, the effects of charge trapping and drift motion of holes on energy determinations of photons detected by the detectors are substantially reduced.

FIG. 2 shows a detector 40 of the type described in the referenced articles. Detector 40 comprises a semiconductor crystal 42 (CdZnTe is the semiconductor used in the referenced papers) sandwiched between a cathode 44 and an anode 46. Anode 46 comprises two coplanar comb shaped electrodes, a collecting comb anode 48 and a non-collecting comb anode 50. A voltage difference $V_{AC}$ is applied between cathode 44 and non-collecting anode 50 so that cathode 44 is from a few hundreds of volts to a few kilovolts negative with respect to non-collecting anode 50. A voltage $V_{AA}$ is applied between collecting anode 48 and non-collecting anode 50 so that collecting anode 48 is positive with respect to non-collecting anode 50 by a few tens of volts to a hundred volts.

Because of the voltage difference between collecting anode 48 and non-collecting anode 50, when a photon ionizes material in the detector crystal, collecting anode 48 collects substantially all the electrons produced by the photon. The charge on collecting anode 48 is the sum of the charge of the collected electrons and a charge induced by the electric field of trapped and slowly moving holes. The charge on non-collecting anode 50 is substantially only a charge induced by the electric field of the trapped and slowly moving holes. The charge induced by the slowly moving holes is the same for both comb electrodes. Thus, the difference between the charges on collecting anode 48 and non-collecting anode 50 is the charge on collecting anode 48 resulting from the collected electrons only. The difference between the sensed charges (assuming proper calibration and adjustment of electronic circuits used to sense and process the charges) on collecting and non-collecting anodes 48 and 50 respectively, is therefore a relatively accurate measure of the number of electrons produced by the photon and is used to determine the energy of the photon.

While a detector with coplanar comb electrodes of the type shown in FIG. 2 has improved energy resolution for detected photons it does not measure the positions of detected photons.

It would be desirable to have a pixelated detector for photons that has one or more of, improved energy resolution, stopping power and an output signal that can be used as an accurate indicator of the time at which a detected photon is incident on the detector.

SUMMARY OF THE INVENTION

One aspect of some preferred embodiments of the present invention is related to improved methods for determining the time at which a photon, detected by a pixelated detector, is incident on the detector.

According to a preferred embodiment of the invention an output signal from the cathode of the pixelated detector is used to determine the time at which a photon is incident on the pixelated detector.

According to another preferred embodiment of the invention, an output signal that is the sum of output signals from a plurality of anode pixels of the pixelated detector is used to determine the time at which a photon is incident on the pixelated detector.

According to yet another aspect of preferred embodiment of the present invention the sum of output signals from all anode pixels of the pixelated detector is used to determine the time at which a photon is incident on the pixelated detector.

Output signals generated at individual anode pixels of a pixelated detector are highly variable in shape and exhibit considerable jitter in onset time with respect to the time that detected photons are incident on the detector. As a result, an output signal from a single anode pixel of the detector cannot be used, by itself, for accurate timing applications, i.e. the single anode signal is not an accurate indicator of the time at which a photon is incident on the detector. The accuracy with which a timing signal can be used to determine when a photon is incident on a detector is hereinafter referred to as the "time resolution" of the timing signal. The most significant contributor to the variability and time jitter of output signals from a single anode pixel is referred to herein as a "small pixel effect".

The charges on the anode pixels of a pixelated detector, by which a photon incident on the detector is sensed, are charges that are induced by electric fields generated by the electrons and holes produced in the detector crystal by the photon. The small pixel effect results from the fact that the anode pixels are generally smaller than characteristic distances over which the generated electric fields change. As a result, the amount of induced charge on different anode pixels and the way the induced charge on an anode pixel changes vary with time vary differ significantly from anode pixel to anode pixel and from event to event. These variations are caused mainly by variations in the depth in the detector crystal at which a given gamma ray photon interacts with the detector and the lateral position of the event with respect to pixel edges. Therefore, the amount and time development of the induced charge on a single anode pixel cannot be used to provide an accurate timing signal. By using an output signal from the cathode or a sum of output signals from a plurality of anode pixels for a timing signal, the effective size of the electrode used to provide the timing signal is increased and the small pixel effect is avoided.

Another aspect of some preferred embodiments of the present invention is related to pixelated detectors with improved energy resolution for detected photons.

In accordance with a preferred embodiment of the present invention, a pixelated detector is provided, in which each anode pixel of the detector comprises two comb electrodes, a collecting comb anode and a non-collecting comb anode. When a photon is detected by the detector, the number of electrons produced by the photon that is collected on an anode pixel is relatively accurately determined from the difference between induced charges sensed on the two comb anodes of the anode pixel. The energy of the photon is estimated from the sum of the numbers of electrons collected on all anode pixels.

In preferred embodiments of the invention, the location in the detector crystal at which the photon deposited its energy is determined from magnitudes of differences between induced charges sensed on collecting and non-collecting anodes determined for a plurality of anode pixels.

In preferred embodiments of the invention, induced charge sensed on the cathode is used to determine the time at which the photon deposited its energy in the detector crystal. Alternatively, the sum of induced charges sensed on all collecting and non-collecting anodes is used to determine the time at which the photon deposited its energy in the detector crystal.

According to yet another aspect of some preferred embodiments of the present invention, a pixelated detector is provided wherein the anode pixels are arranged in rows and columns as a rectangular array of anode pixels. For each row of anode pixels, signals (i.e. sensed induced charge) from collecting anodes in the row are added to form a row signal. For each column of anode pixels signals from non-collecting anodes in the column are added to form a column signal.

In accordance with this preferred embodiment of the present invention, the energy of a detected photon is estimated from the sum of row signals minus the sum of column signals. The location in the detector crystal at which the photon deposited its energy is preferably determined using Anger arithmetic applied to row signals and column signals. Anger arithmetic applied to row signals provides a coordinate for the location of the photon along a direction parallel to the columns and Anger arithmetic applied to column signals provides a coordinate for the photon location along a direction parallel to the rows. Preferably, a timing signal for determining when the photon deposited its energy in the crystal detector is derived from the sum of row and column signals. Alternatively, a timing signal is a signal from the cathode. The processing of row and column signals can be either analog or digital.

An aspect of other preferred embodiments of the present invention is related to pixelated photon detectors having an improved stopping power for photons.

In accordance with a preferred embodiment of the present invention, a pixelated detector is provided in which the semiconductor material from which the detector is made relatively thick in the direction along which photons are incident on the detector. (Hereinafter the term "thickness" refers to the dimension of a detector parallel to the general direction along which photons travel.) As a result, the detector has a relatively large stopping power for incident photons.

In a preferred embodiment of the present invention, a thick detector is built up of a plurality of thin semiconductor crystals, hereinafter referred to as "detector plates", preferably in the shape of thin rectangular semiconductor plates. Such plates are readily manufactured using present state of the art technology. A detector plate has first and second parallel planar face surfaces and narrow edge surfaces. Preferably, all the detector plates are identical. A thick detector, of this type, is hereinafter referred to as a "multilayer detector".

Each of the detector plates has a cathode contiguous with one face surface and an anode contiguous with the other face surface. A detector plate is "activated" when a potential difference is applied between the anode and cathode so as to create a detector field in the semiconductor material of the detector plate. Electron and hole pairs created by a photon incident on an activated detection plate drift to the anode and cathode respectively, and generate signals on the anode and cathode, as described above. However, since the anode and cathode of a detection plate are relatively close together, variations in location along the field direction at which the electrons and holes are created are relatively small. As a result, the signals are relatively insensitive of the location in the crystal at which the photon deposits its energy.

In a first type of multilayer detector, in accordance with a preferred embodiment of the present invention, the detectors plates of the plurality of detector plates are oriented so that incident photons travel in directions substantially perpendicular to the face surfaces of the detector plates. The thickness of these multilayer detectors is therefore equal to the sum of the thicknesses of all the detector plates of the plurality of detector plates. In these preferred embodiments of a multilayer detector, preferably the anodes and cathodes of each of the detector plates are similar to those of one of the pixelated detectors described above. Preferably, each of the detector plates is operated in a manner similar to the manner in which the pixelated detector described above having an anode and cathode similar to that of the detector plate is operated.

In a second type of multilayer detector, in accordance with preferred embodiments of the present invention, the detection plates of the plurality of detection plates are oriented so that incident photons travel in a direction parallel to the face surfaces of the detection plates. In a multilayer detector in accordance with these preferred embodiments of the present invention face surfaces of the detector plates in the multilayer detector are contiguous and incident photons preferably enter the multilayer detector along directions that are generally perpendicular to edge surfaces of detector plates. The thickness of the multilayer detector in this case is therefore is equal to the length or the width of the detector plates, in accordance with a preferred embodiment of the present invention.

Each of the detector plates used to form the multilayer detector of the second type preferably has a cathode that covers substantially all the area of the first face surface of the detector plate. The second face surface of the detector plate preferably has an anode comprising a plurality of closely spaced narrow rectangular conducting strips that are parallel to an edge of the second face surface. The conducting strips are hereinafter referred to as "anode strip pixels". The anode strip pixels preferably have a length that is substantially equal to the length of the edge of the second face surface to which they are parallel and a width that determines the anode strip pixel size. Preferably, the anode strip pixels cover substantially all the area of the second face surface. The detector plates in the multilayer detector are preferably oriented so that the anode strip pixels of all detector plates in the multilayer detector are parallel.

The anode strip pixels in the multilayer detector are preferably oriented so that they are substantially parallel to the momentum vector of photons to be detected. A detected photon therefore deposits its energy in the detector by producing electron hole pairs in the semiconductor material of the detector by ionization along a path substantially parallel to the anode strip pixels. As a result, the electrons and holes produced by the photon generate signals on at most one or a few anode strip pixels and on one or at most a few cathodes in the multilayer detector.

Preferably, signals, (generated by sensed induced charges) from each anode strip pixel and each cathode are separately detected.

The magnitudes of signals from the anode strip pixels are used to determine the location in the detector at which the detected photon is incident. The energy of the detected photon is determined from the sum of signals generated on all the anode strip pixels. Preferably, the sum of signals from all anode strip pixels that have signals is used to determine when the detected photon was incident on the detector. Alternatively signals from cathodes are used.

In a variation of a multilayer detector, in accordance with this preferred embodiment of the present invention, each of the anode strip pixels comprises two anode strip combs, a collecting and non-collecting anode strip comb. The collecting and non-collecting anode strip combs operate similarly to the manner in which collecting and non-collecting anode combs operate for anode pixels comprising comb anodes described above.

In general, signals from pixelated detectors require significant processing. As indicated in the discussion of FIG. 1, some of the processing is performed in the prior art by ASICs located in a detector base to which the detector is mounted. Generally, the ASICs generate a significant amount of heat and transfer heat to the detector through a surface of the detector with which they are in close proximity. Whereas the ASICs can tolerate operating temperatures as high as 120°, the semiconductor material of crystal 22 must generally be maintained at temperatures significantly below 30°. For example, the temperature of a CdTe crystal is preferably maintained within a temperature range from minus 10° C. to plus 10° C. in order for the crystal to operate effectively. At 30° C. a semiconductor detector using a CdTe crystal is substantially inoperable. Significant effort and care must therefore be invested to provide cooling for the crystal of a pixelated detector to prevent the detector operation from being seriously degraded by heat. The task of cooling the detector crystal is made difficult since the surface of the crystal through which heat is transferred to the crystal from the ASICs is covered by the ASICs and is therefore not easily accessible.

In accordance with another aspect of some preferred embodiments of the present invention, ASICs used for processing anode pixel signals of a pixelated detector are located at a distance from the detector. Electrical contacts between the anode pixels and the ASICs are made via conductors in a length of printed circuit board on which the ASICs are mounted. By removing the ASICs from proximity with the detector, the detectors may be more easily cooled.

There is therefore provided in accordance with a preferred embodiment of the present invention a method for determining the time at which a photon is incident on a pixelated detector, the pixelated detector comprising a semiconductor crystal having a cathode electrode and an anode having a plurality of anode pixel electrodes, wherein the photon produces mobile electrons and holes in material of the crystal by ionization, the method comprising: applying a potential difference between the cathode and the anode so that the holes drift to the cathode and the electrons drift to the anode; producing a signal, induced by the drifting electrons and holes, on at least one electrode of the crystal, the at least one electrode having a size larger than a single anode pixel; and determining a time at which the electrons and holes are generated based on the signal. Preferably, the at least one electrode comprises a plurality of the anode pixels. Preferably, the plurality comprises all anode pixels of the anode electrode array. Alternatively, the at least one electrode preferably comprises the cathode.

There is further provided, in accordance with a preferred embodiment of the present invention, a pixelated detector for detecting photons incident on the pixelated detector comprising: a semiconductor crystal; a cathode electrode on a first surface of the crystal; an anode comprising a plurality of anode pixel electrodes on a second surface of the crystal; and a signal generator that receives signals from at least one electrode of the electrodes; wherein an incident photon produces mobile electrons and holes in the crystal that induce signals on electrodes of the electrodes and the signal generator generates a timing signal responsive to induced signals on the at least one electrode and wherein the at least one electrode has a size larger than the size of a single anode pixel electrode. Preferably, the timing signal is responsive to the sum of the induced signals from all electrodes in the at least one electrode. Alternatively, the at least one electrode preferably comprises at least two of the anode pixel electrodes. Preferably, the at least two of the anode pixel electrodes comprises all of the anode pixel electrodes. Alternatively, the at least one electrode is preferably the cathode electrode.

There is also provided, according to a preferred embodiment of the present invention a pixelated detector for detecting photons incident on the pixelated detector comprising: a semiconductor crystal; a cathode electrode on a first surface of the crystal; and an anode comprising a plurality of anode pixels on a second surface of the crystal wherein each anode pixel comprises a collecting anode electrode and a non-collecting anode electrode; wherein an incident photon produces mobile electrons and holes in the crystal that induce signals on electrodes of the electrodes.

Preferably the pixelated detector comprises a power source that provides a potential difference between collecting and non-collecting anode electrodes so that collecting anode electrodes are at a higher potential than non-collecting anode electrodes, wherein the potential difference has a magnitude such that substantially all the electrons created in the crystal by the photon are collected by the collecting anode electrodes.

In some preferred embodiments of the present invention collecting and non-collecting anode electrodes are interleaved comb anode electrodes.

The anode pixels in some preferred embodiments of the present invention are positioned with respect to each other so as to form rows and columns of anode pixels in a rectangular array of anode pixels.

In some preferred embodiments of the present invention, each collecting anode electrode and each non-collecting anode electrode is connected to a different charge preamplifier, the charge preamplifier providing an output signal responsive to the induced signals on the collecting or non-collecting anode electrodes to which it is connected.

Preferably, the charge preamplifiers for collecting and non-collecting anode electrodes of each anode pixel are connected to different inputs of a same differential amplifier and collecting and non-collecting anodes of different anode pixels are connected to different differential amplifiers and wherein each differential amplifier provides a signal sensitive to the energy of the photon responsive to the difference between output signals of the charge preamplifiers to which it is connected.

The pixelated detector preferably comprises a combiner that receives the energy sensitive signals from at least one of the differential amplifiers and provides an energy sensitive signal that is responsive to the sum of the energy sensitive signals that it receives. Preferably, the at least one differential amplifier comprises all of the differential amplifiers. In some preferred embodiments of the present invention the pixelated detector comprises a combiner that receives output signals from a plurality of the charge preamplifiers of collecting and non-collecting anode electrodes, and provides a timing signal that is responsive to the sum of the output signals. Preferably, the plurality of charge preamplifiers comprises all charge preamplifiers.

In a pixelated detector according to some preferred embodiments of the present invention, in which anode pixels are positioned with respect to each other so as to form rows and columns of anode pixels in a rectangular array of anode pixels, collecting anode electrodes in a same row of anode pixels are connected together and non-collecting anode electrodes in a same column of anode pixel electrodes are connected together.

Preferably the pixelated detector comprises a combiner that receives an output signal from at least one group of connected together collecting anode electrodes and at least one group of connected together non-collecting anode electrodes and provides a timing signal responsive to the sum of the received signals.

Preferably, the at least one group of connected together anode electrodes comprises all groups of connected together anode electrodes and the at least one group of connected together non-collecting anode electrodes comprises all groups of connected together non-collecting anode electrodes.

In accordance with some preferred embodiments of the present invention the pixelated detector preferably comprises a combiner that receives an output signal from at least one group of connected together collecting anode electrodes and at least one group of connected together non-collecting anode electrodes and provides an energy sensitive signal responsive to the difference between the sum of the received signals from the at least one group of connected together collecting anode electrodes and the sum of the received signals from the at least one group of connected together non-collecting anode electrodes.

Preferably, the at least one group of connected together collecting anode electrodes comprises all groups of connected together collecting anode electrodes and the at least one group of connected together non-collecting anode electrodes comprises all groups of connected together non-collecting anode electrodes.

In a pixelated detector according to some preferred embodiments of the present invention, each group of connected together collecting anode electrodes is connected to a different row preamplifier and each group of connected together non-collecting anode electrodes is connected to a different column preamplifier, and each preamplifier provides output signals responsive to induced signals on anode electrodes of the group of connected together anode electrodes to which it is connected.

Preferably, the pixelated detector comprises a combiner that receives the output signals from at least one row preamplifier and at least one column preamplifier and provides a timing signal responsive to the sum of the output signals of the preamplifiers. Preferably, the at least one row preamplifier comprises all row preamplifiers and the at least one column preamplifier comprises all column preamplifiers.

Some pixelated detectors in accordance with preferred embodiments of the present invention, comprise a combiner that receives the output signals from at least one row preamplifier and at least one column preamplifier and provides an energy sensitive signal responsive to the difference between the sum of the received signals from the at least one row preamplifier and the sum of the received signals from the at least one column preamplifier. Preferably, the at least one row preamplifier comprises all row preamplifiers and wherein the at least one column preamplifier comprises all column preamplifiers.

Some pixelated detectors, in accordance with preferred embodiments of the present invention, comprise a signal generator that provides a timing signal responsive to a signal of the signals induced on the cathode electrode.

Some pixelated detectors, in accordance with preferred embodiments of the present invention, comprise a processing means that receives a timing signal and determines a time indicative of the time that the photon is incident on the pixelated detector.

Some pixelated detectors, in accordance with preferred embodiments of the present invention, comprise a processing means that receives energy sensitive signals and determines an energy for the incident photon.

There is further provided, in accordance with a preferred embodiment of the present invention, a method for determining the energy of a photon incident on a pixelated detector comprising a semiconductor crystal having a cathode and an anode on surfaces thereof, the anode comprising a plurality of anode pixels, the method comprising: providing each anode pixel of the anode with a collecting anode and a non-collecting anode; applying a first potential difference between the anode and cathode so that holes generated by the photon drift to the cathode and electrons generated by the photon drift to the anode; applying a second potential difference between the collecting anode and the non-collecting anode of each anode pixel so that the collecting anode is positive with respect to the non-collecting anode wherein the second potential difference is sufficiently large so that substantially all electrons are collected on the collecting anode; sensing charges induced by the drifting electrons and holes on the collecting and non-collecting anode of at least one anode pixel; determining the energy of the photon from the sensed charges on the collecting sand non-collecting anodes.

Preferably, determining the energy of the photon comprises determining the difference between induced charges sensed on the collecting and non-collecting anodes of at least one anode pixel. Additionally or alternatively, the at least one anode pixel comprises a plurality of anode pixels. Preferably, plurality of anode pixels comprises all anode pixels of the anode. Additionally or alternatively, sensing induced charges preferably comprises sensing induced charge on at least one group of connected together collecting anodes and on at least one group of connected together non-collecting anodes.

There is further provided in accordance with a preferred embodiment of the present invention a gamma camera comprising: a plurality of pixelated detectors wherein each pixelated detector provides a detector signal responsive to photons that are incident on it; a plurality of processing circuits that receive the detector signals and provide processed signals responsive to the detector signals; and at least one printed circuit board on which the processing circuits are mounted and having conductors thereon that carry the detector signals to the processing circuits; wherein the processing circuits are mounted on the printed circuit board at locations remote from the detectors.

Preferably, the gamma camera comprises a motherboard having conductors thereon, wherein conductors in the mother board and conductors in the printed circuit board are in electrical contact and wherein the conductors on the motherboard carry processed signals.

Alternatively or additionally, the gamma camera includes a heat-insulating material positioned between the pixelated detectors and the processing circuits. Preferably, the heat-insulating material and the pixelated detectors are spaced apart.

The gamma camera preferably comprises an air circulator that circulates air in the space between the heat-insulating material and the pixelated detectors.

Alternatively or additionally, the heat-insulating material and the processing circuits are preferably spaced apart. Preferably, the gamma camera comprises an air circulator that circulates air in the space between the heat insulating material and the processing circuits. Additionally or alternatively, the gamma camera comprises an air cooler that cools air circulated by the air circulator.

Some gamma cameras, in accordance with preferred embodiments of the present invention, comprise a cooling system comprising heat pipes and a means for removing heat from the heat pipes wherein the heat pipes carry heat from the gamma camera to the means for removing heat.

Some gamma cameras, in accordance with preferred embodiments of the present invention, comprise a cooling system having a refrigerant fluid, a means for removing heat from the refrigerant fluid and a means for circulating the refrigerant fluid between the gamma camera and the means for removing heat.

Additionally or alternatively pixelated detectors of the plurality of pixelated detectors are pixelated detectors in accordance with a preferred embodiment of the present invention.

Additionally or alternatively the processing circuits are comprised in ASICs.

There is further provided in accordance with a preferred embodiment of the present invention, a method of connecting a pixelated detector with processing circuits for processing signals from the detector comprising: locating the processing circuits so that they are remotely situated with respect to the pixelated detector; and connecting the pixelated detector to the processing circuits via conductors of a printed circuit board.

There is further provided, in accordance with a preferred embodiment of the present invention a method of protecting pixelated detectors in a gamma camera from heat radiated by processing circuits that process signals from the pixelated detectors comprising: locating the processing circuits so that they are remotely situated with respect to the pixelated detector so as to provide a space between the pixelated detectors and the processing circuits; connecting the pixelated detector to the processing circuits via conductors of a printed circuit board; and circulating air in the space.

Preferably, the method comprises positioning heat-insulating material in the space between the pixelated detectors and the processing circuits. Preferably, positioning heat-insulating material comprises positioning heat-insulating material so that there is a space between the heat-insulating material and the pixelated detectors.

Circulating air preferably comprises circulating air in a region of the space between the heat-insulating material and the pixelated detectors.

Additionally or alternatively, positioning heat-insulating material preferably comprises positioning heat-insulating material so that there is a space between the heat-insulating material and the processing circuits.

Preferably, circulating air comprises circulating air in a region of the space between the heat-insulating material and the processing circuits.

Additionally or alternatively circulating air preferably comprises cooling air and circulating cooled air.

Additionally or alternatively the processing circuits are preferably comprised in ASICs.

There are further provided, in accordance with a preferred embodiment of the present invention, multilayer pixelated detectors of the present invention, multilayer pixelated detectors comprising a plurality of pixelated detectors in accordance with preferred embodiments of the present invention, that are stacked such that a line passing through substantially the center of an anode pixel of any of the pixelated detectors, perpendicular to the plane of the anode pixel, passes substantially through the center of an anode pixel of each of the other pixelated detectors in the plurality of pixelated detectors. Preferably, at least two adjacent pixelated detectors of the stack are displaced from each other. Additionally or alternatively, at least two pixelated detectors of the stacked pixelated detectors are contiguous.

There is further provided, in accordance with a preferred embodiment of the present invention a pixelated detector comprising: a rectangular semiconductor crystal having first and second relatively large parallel planar face surfaces having edges; a cathode electrode covering substantially all of the first face surface; an anode electrode comprising a plurality of anode strip pixels, wherein an anode strip pixel comprises a rectangular electrode having a length and a width; wherein a long dimension of each anode strip pixel is parallel to a same edge of the second face surface.

Preferably, the anode strip pixels comprise a single conductor. Alternatively, each of the plurality of anode strip pixels preferably comprises a collecting comb electrode interleaved with a non-collecting comb electrode. Alternatively or additionally the anode strip pixels are identical. Preferably, the length of the anode strip pixels is substantially equal to the edge to which the long dimension of each of the anode strip pixels are parallel. The anode strip pixels are preferably equally spaced. Preferably, the plurality of anode strip pixels cover substantially all of the second face surface.

There are further provided multilayer pixelated detectors according to preferred embodiments of the present invention comprising a plurality of identical pixelated detectors having anode strip pixels, in accordance with preferred embodiments of the present invention, wherein the pixelated detectors have contiguous face surfaces and wherein edges of contiguous face surfaces are aligned and wherein anode strip pixels of all pixelated detectors are parallel.

In some multilayer pixelated detectors, in accordance with preferred embodiments of the present invention, electrodes on contiguous surfaces of pixelated detectors are identical and overlap substantially completely.

In some multilayer pixelated detectors, in accordance with preferred embodiments of the present invention, there is only one anode or only one cathode between contiguous surfaces of pixelated detectors.

There are further provided gamma cameras, in accordance with preferred embodiments of the present invention, comprising a plurality of pixelated detectors in accordance with preferred embodiments of the present invention.

The invention will be more clearly understood by reference to the following description of preferred embodiments thereof read in conjunction with the figures attached hereto. In the figures identical structures, elements or parts which appear in more than one figure are labeled with the same numeral in all the figures in which they appear.

BRIEF DESCRIPTION OF FIGURES

FIGS. 9A and 9B schematically show a detector plate, in accordance with another preferred embodiment of the present invention;

DETAILED DESCRIPTION OF PREFERRED EMBODIMENTS

Figure 3A:
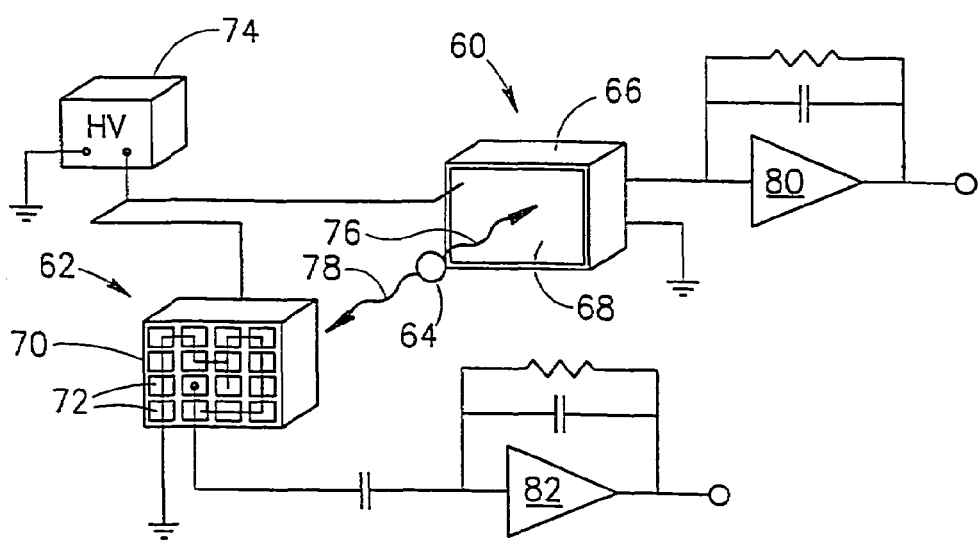
FIG. 3A schematically illustrates an experiment that demonstrates the relatively poor time resolution of timing signals from single anode pixels of a pixelated detector.
Figure 4A:
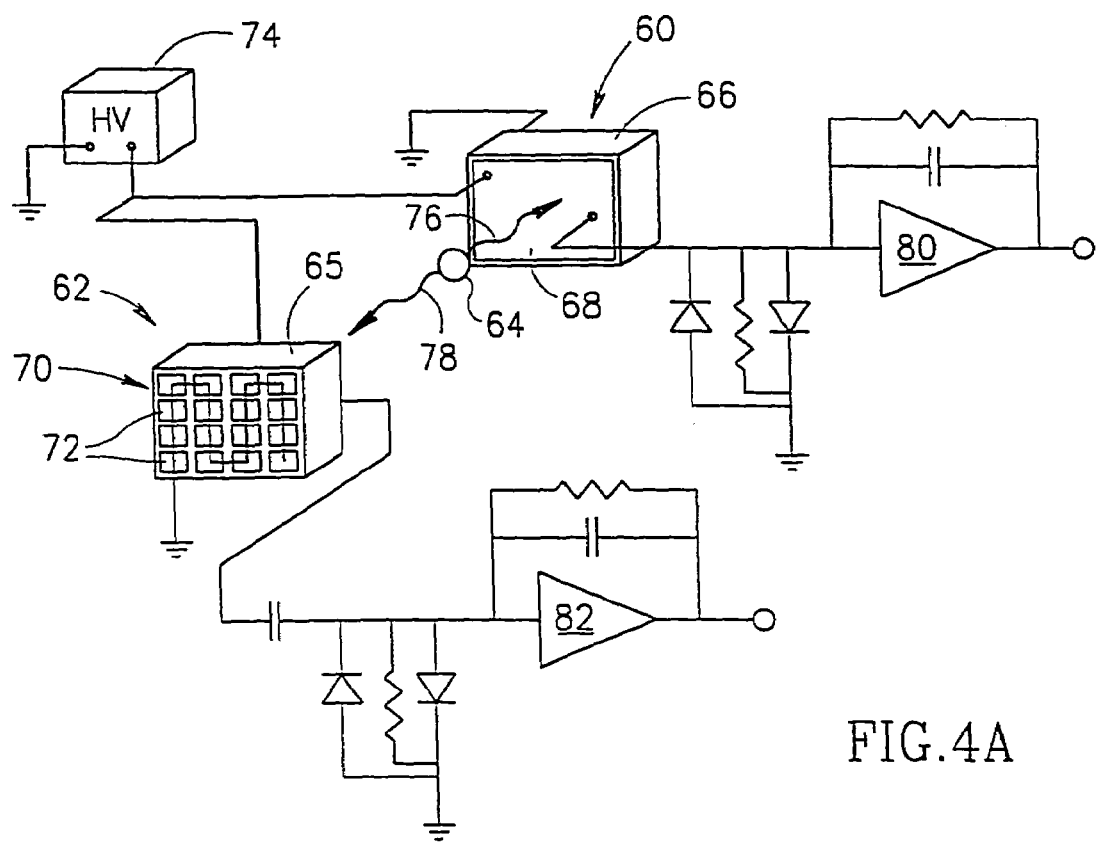
FIG. 4A schematically illustrates an experiment that demonstrates the improved time resolution of timing signals from the cathode of a pixelated detector, in accordance with a preferred embodiment of the present invention.
Figure 5A:
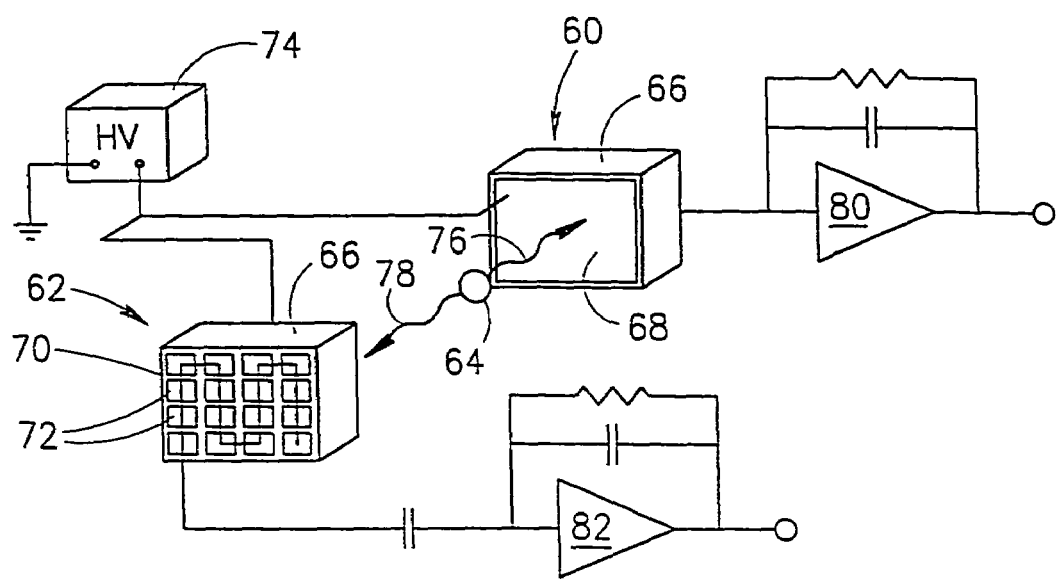
FIG. 5A schematically illustrates an experiment that demonstrates the improved time resolution of timing signals from a pixelated detector wherein the timing signals are the sums of signals from a plurality of anode pixels, in accordance with a preferred embodiment of the present invention.

FIGS. 3A, 4A and 5A schematically show a series of experiments performed by the inventors of the present invention that demonstrate the time resolution of different signals from a pixelated detector.

The experiment illustrated in FIG. 3A demonstrates the relatively poor time resolution of timing signals from single anode pixels, which signals are affected by the small pixel effect. The experiment illustrated in FIG. 4A demonstrates the greatly improved time resolution of timing signals from the cathode of a pixelated detector, in accordance with a preferred embodiment of the present invention. The experiment illustrated in FIG. 5A demonstrates that a timing signal from a pixelated detector that is a sum of signals from anode pixels of the detector can provide even better time resolution than a timing signal from the cathode of the detector, in accordance with a preferred embodiment of the present invention.

Each of the experiments consisted of exposing two identical pixelated detectors 60 and 62 to photons from a $Ge^{68}$ point source 64 that was placed between them. Each detector 60 and 62 comprises a crystal 66 of CdZnTe (CZT) having a cathode 68 and an anode 70 comprising 16 anode pixels 72. Detectors 60 and 62 were placed facing each other so that in FIGS. 3A, 4A, and 5A only cathode 68 of detector 60 is visible and only anode 70 of detector 62 is visible. Anode pixels 72 of detectors 60 and 62 were 2 mm×2 mm in extent and spaced 2.5 mm apart center to center. The thickness of crystal 66 between cathode 68 and anode 70 of each detector 60 and 62 was 4 mm. A potential difference of 800 Volts was applied between cathode 68 and anode 70 of each detector 60 and 62 from a power supply 74. Source 64 emitted pairs of simultaneous oppositely directed photons, indicated by wavy arrows 76 and 78, so that each time a photon 76 from source 64 was incident on detector 60 a photon from source 64 was simultaneously incident on detector 62.

In each experiment, an output signal from each detector 60 and 62 was used as a timing signal from which to determine when a photon was incident respectively on detector 60 and 62. Each time detectors 60 and 62 were simultaneously irradiated by photons 76 and 78 from source 64, hereinafter referred to as an "event", the difference in time between the timing signals from detectors 60 and 62, generated by the photons was measured using a high speed digitizing oscilloscope. The differences in timing signals from a plurality of events were plotted to provide a distribution curve of the time differences. For each event the pulse height of the timing pulse from each detector 60 and 62 was also registered. Pulse height was used as a measure of the energy of a photon that generated a timing signal in a detector 60 and 62.

In the experiment shown in FIG. 3A, a single anode pixel 72 of detector 60 (not visible in the perspective of FIG. 3) was connected to a charge preamplifier 80 and a single anode pixel 72 of detector 62 was connected to a charge preamplifier 82. The output signals of charge preamplifiers 80 and 82 were used as timing signals for detectors 60 and 62 respectively. The results of the experiment in FIG. 3A are a measure of the effects of the small pixel effect on the timing resolution of signals from a single anode pixel.

Figure 3B:
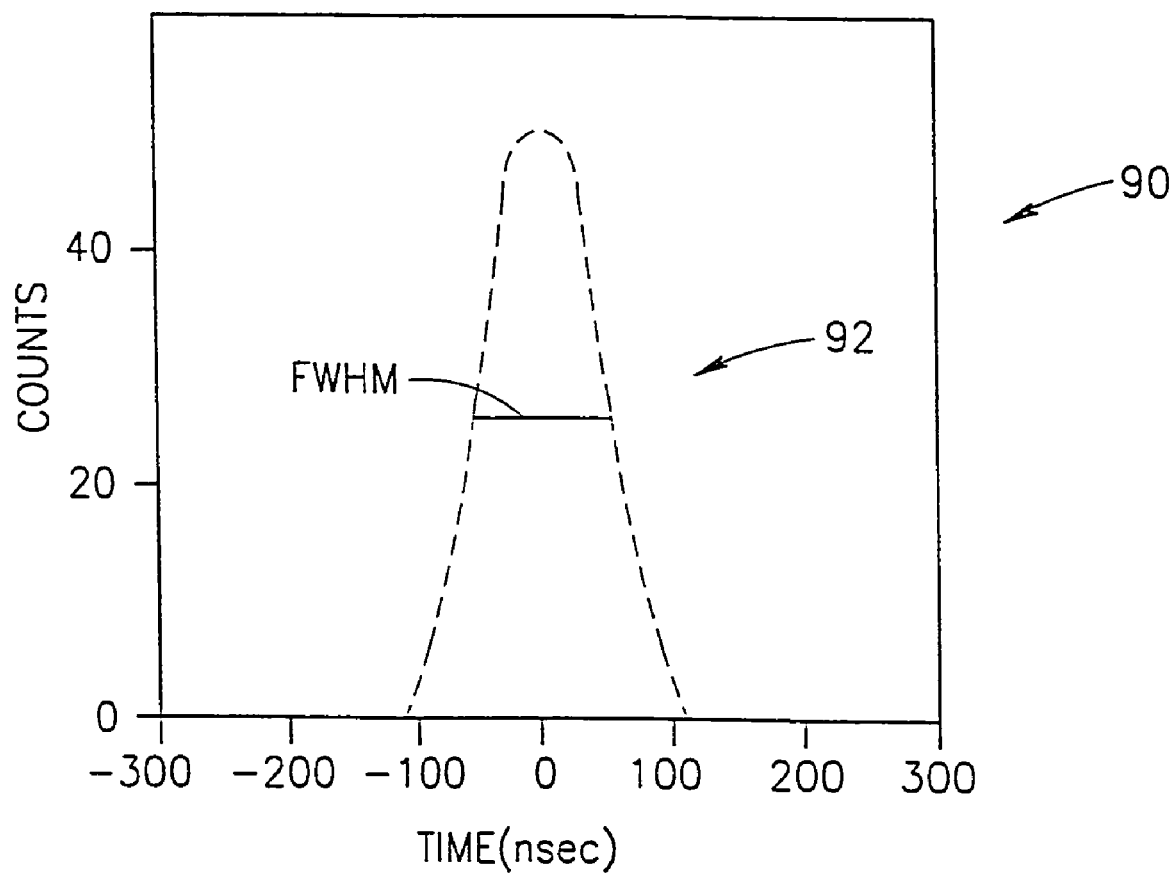
FIG. 3B shows in graphical form results of the experiment shown in FIG. 3A.

FIG. 3B shows the results of the experiment in a graph 90 showing a frequency distribution 92 of the time differences between timing signals for events recorded in the experiment. The abscissa of graph 90 is time in nanoseconds and the ordinate is the number of events recorded during the experiment for the time differences on the abscissa. Distribution 92 has a $\sigma \sim 36$ nsec, FWHM (Full Width Half Maximum) ~84 and FWTM (Full width Tenth Maximum) ~154 nsec.

In the experiment shown in FIG. 4A, cathode 68 of detector 60 was connected to charge preamplifier 80 and cathode 68 of detector 62 was connected to charge preamplifier 82. The output signals of preamplifiers 80 and 82 were used as timing signals for detectors 60 and 62, in accordance with a preferred embodiment of the present invention. The experiment demonstrates the improvement in time resolution that can be achieved by using a timing signal from a large electrode such as cathode 68 in comparison to using a timing signal from an anode pixel 72, in accordance with a preferred embodiment of the present invention.

Figure 4B:
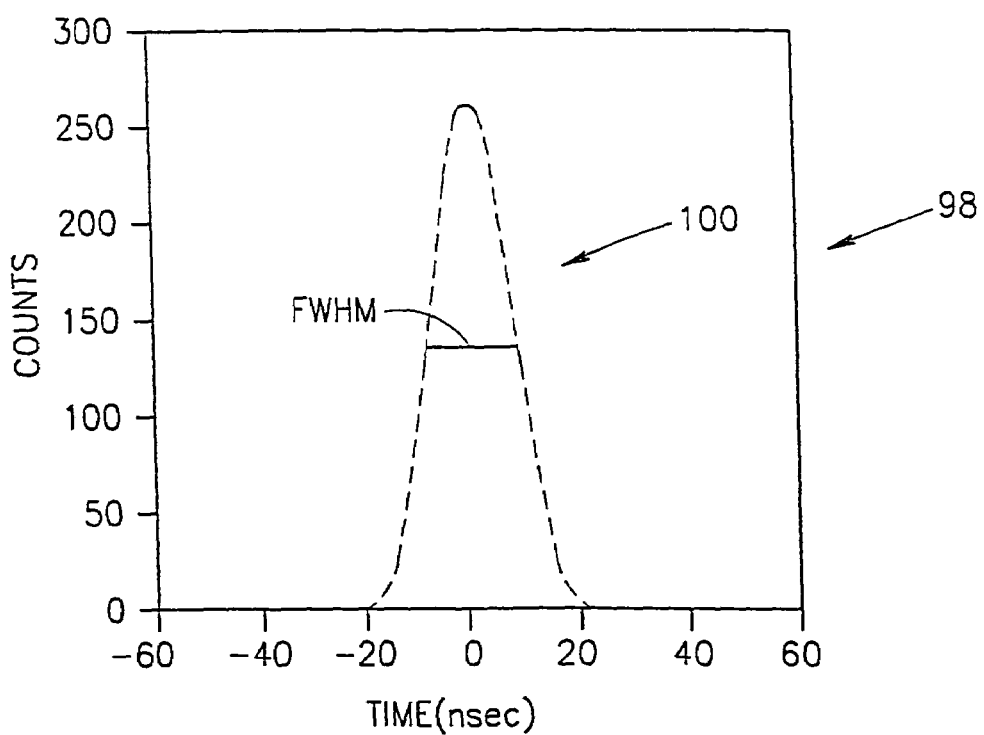
FIG. 4B shows in graphical form the results of the experiment shown in FIG. 4A.

The results of the experiment are shown in FIG. 4B which shows a graph 98 of a "time difference" frequency distribution 100 for timing signals from detectors 60 and 62 for events of all energies recorded in the experiment. Note that the time scale of the abscissa of graph 98 is one fifth the time scale of the graphs shown in FIG. 3B. Distribution 100 has a σ~7 nsec, FWHM ~17 and FWTM ~31 nsec. The ratio of the standard deviation of distribution 92 in FIG. 3B to distribution 100 in FIG. 4B is approximately five. Thus fivefold improvement in time resolution of coincidence measurements between pixelated detectors 60 and 62 can be achieved in comparison to prior art using timing signals from a large electrode such as cathode 68, in accordance with a preferred embodiment of the present invention.

In the experiment shown in FIG. 5A, the timing signal for each detector 60 and 62 was the sum of the output signals from all anode pixels 72 of detectors 60 and 62 respectively. All anode pixels 72 (not seen in the perspective of FIG. 5A) of detector 60 were connected to charge preamplifier 80 and all anode pixels 72 of detector 62 were connected to charge amplifier 82.

Figure 5B:
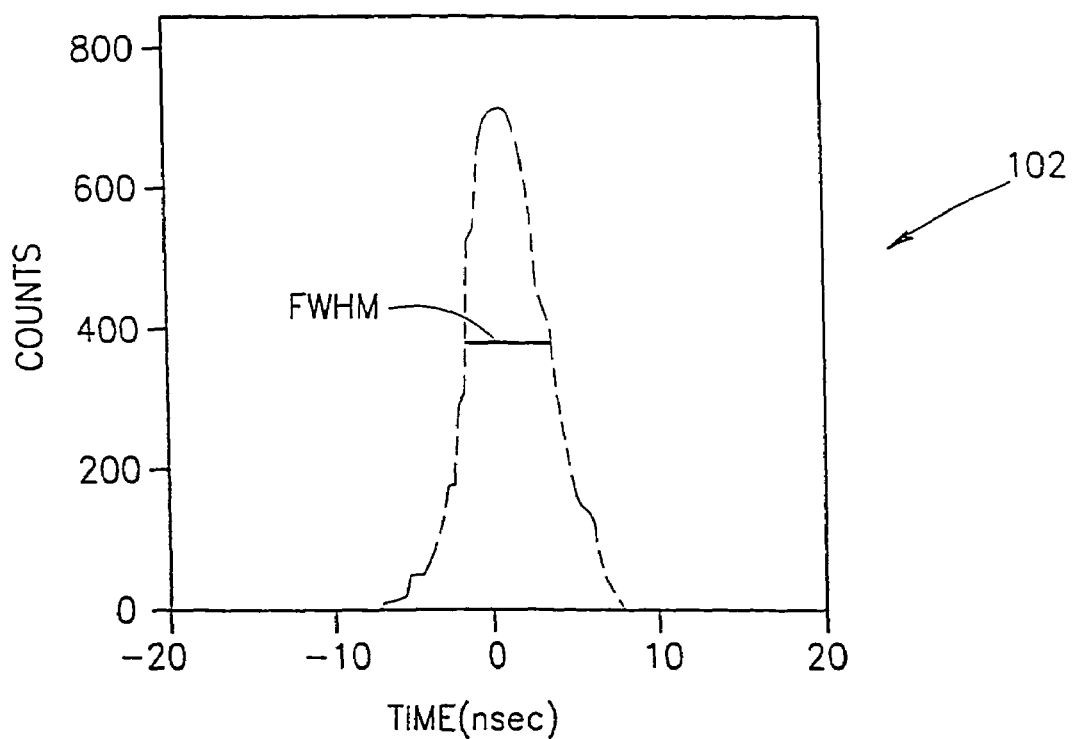
FIG. 5B shows in graphical form the results of the experiment shown in FIG. 5A.

The results of the experiment are shown in FIG. 5B which shows a graph 102 of a time difference distribution 104 for timing signals from detectors 60 and 62 for events of all energies recorded in the experiment. Note that the time scale of the abscissa of graph 102 is one half the time scale of the abscissa in graph 98 of FIG. 4B. Distribution 104 has σ~2 nsec, FWHM ~5 and FWTM ~9 nsec. The results again demonstrate the advantages of using large electrodes of pixelated detectors for timing purposes, in accordance with preferred embodiments of the present invention. The improvement seen in using a sum of anode pixel outputs in comparison to using a cathode output is due to the fact that jitter from the high voltage power supply contributes to time jitter in output pulses taken from the cathode but not from output pulses taken from the anode pixels.

Figure 6:
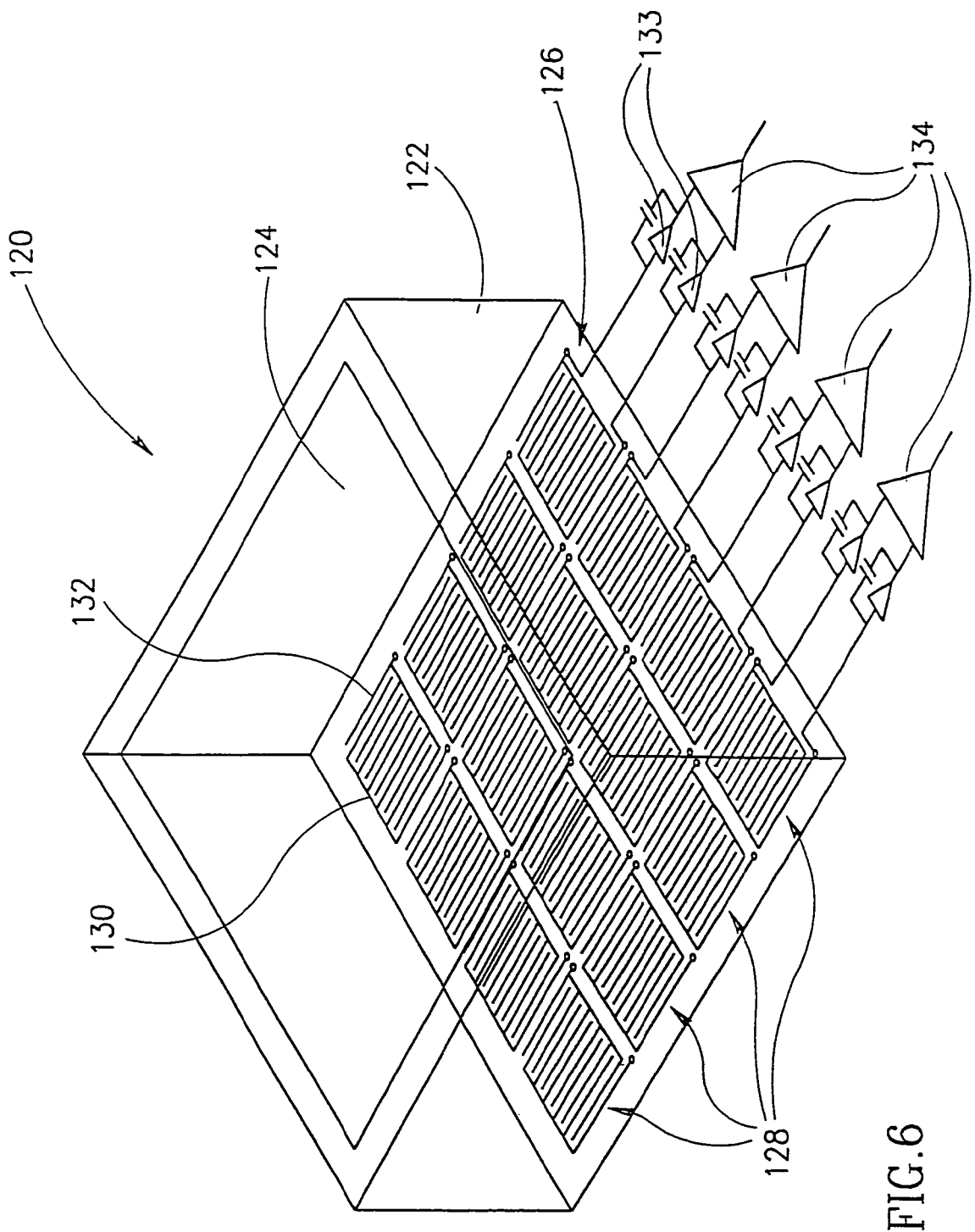
FIG. 6 schematically illustrates a pixelated detector wherein each of the anode pixels of the detector comprises two comb anodes, in accordance with a preferred embodiment of the present invention.

FIG. 6 shows a schematic of a pixelated detector 120 comprising a semiconductor crystal 122 a cathode 124 and an anode 126 comprising pixel anodes 128 in accordance with a preferred embodiment of the present invention. Each pixel anode 128 preferably comprises a collecting comb anode 130 and a non-collecting comb anode 132 each of which is connected to its own charge amplifier 133. The scale of detector 120 and its features have been determined for ease and clarity of presentation. The voltage sources that provide voltage between the anodes and cathode and between the collecting and non-collecting anodes are not shown in the Figs. for clarity.

Figure 2:
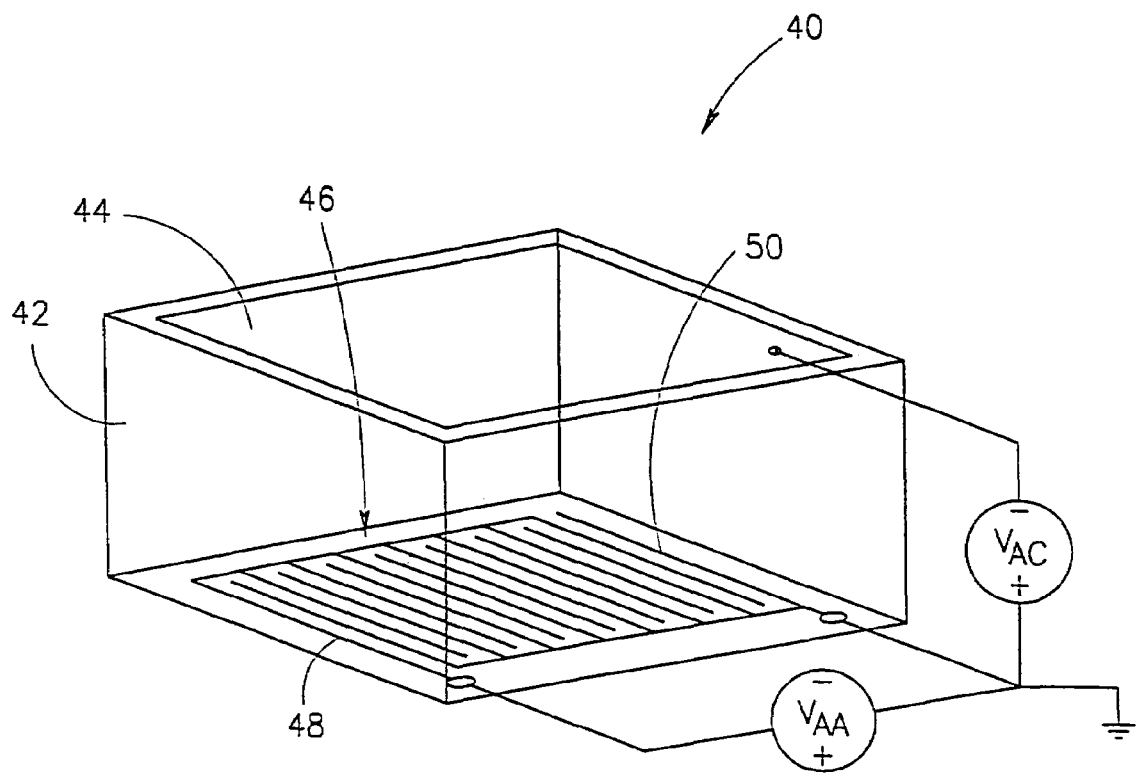
FIG. 2 shows a schematic of a semiconductor photon detector having an anode comprising two comb anodes wherein teeth of the combs are interleaved.

Each anode pixel 128 preferably has its own differential amplifier 134 to which charge amplifier 133 of collecting anode 130 and charge amplifier 133 of non-collecting anode 132 of anode pixel 128 are connected. The output of differential amplifier 134 is proportional to the difference in the induced charges on collecting anode 130 and non-collecting anode 132. The output, as explained above in the discussion of FIG. 2, is therefore a measure of the number of electrons that impact on anode pixel 128 when a photon is incident on crystal 122. Only some of amplifiers 133 and differential amplifiers 134 are shown in FIG. 6.

The energy of a photon incident on detector 120 is preferably estimated from the sum of the outputs of differential amplifiers 134 of all anode pixels 128. The location in detector crystal 122 at which the incident photon deposited its energy is preferably determined from the magnitudes of outputs of individual differential amplifiers 134. An output signal from cathode 124 is preferably used as a timing signal for determining when the photon deposited its energy in the crystal. Alternatively, the outputs of all charge amplifiers 133 of pixelated detector 120 are summed and the sum is preferably used as a timing signal.

Figure 7:
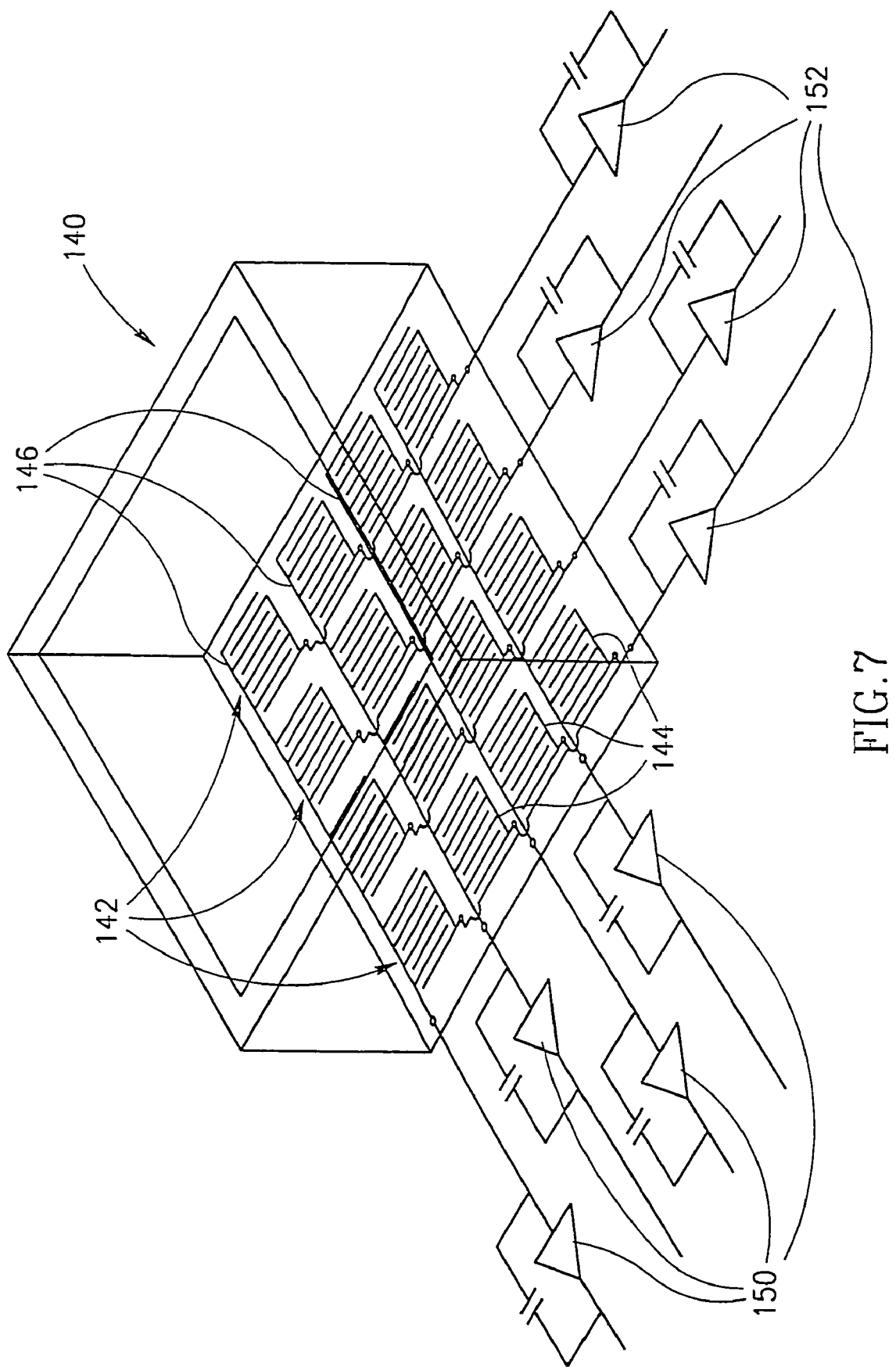
FIG. 7 schematically illustrates another pixelated detector wherein each of the anode pixels of the detector comprises two comb anodes, in accordance with a preferred embodiment of the present invention.

FIG. 7 shows another pixelated detector 140 comprising anode pixels 142 having a collecting anode 144 and a non-collecting anode 146, in accordance with a preferred embodiment of the present invention. The scale of detector 140 and its features have been determined for ease and clarity of presentation.

All collecting anodes 144 of anode pixels 142 in a same row of anode pixels are connected to a same "row" charge preamplifier 150. All non-collecting anodes 146 in a column of anode pixels 142 are connected to a same "column" charge amplifier 152.

A signal, which is the sum of output signals from row preamplifiers 150 minus the sum of output signals from column preamplifiers 152, is a measure of the total number of electrons that is collected by all anode pixels 146 when a photon is detected by detector 140. The signal is therefore a relatively accurate measurement of the energy of the detected photon and is preferably used to determine the energy of the photon in accordance with a preferred embodiment of the present invention.

The location in detector crystal 142 at which the photon deposited its energy is indicated by those anode pixels 142 for which both the anode pixel row preamplifier 150 and the anode pixel column preamplifier 152 provide an output pulse in response to the detected photon.

Preferably, a timing signal for determining when the photon deposited its energy in detector 142 is the sum of output signals from all row and column preamplifiers 150 and 152 respectively. Alternatively, a timing signal is an output signal from cathode 141. The processing of output signals from row and column preamplifiers 150 and 152 respectively can be either analog or digital.

Whereas pixelated detectors 120 and 140 are shown with four rows of four anode pixels each this is by way of example only. Pixelated detectors in accordance with preferred embodiments of the present invention can have different numbers of anode pixels and the anode pixels can be arranged in various geometries.

Figure 8A:
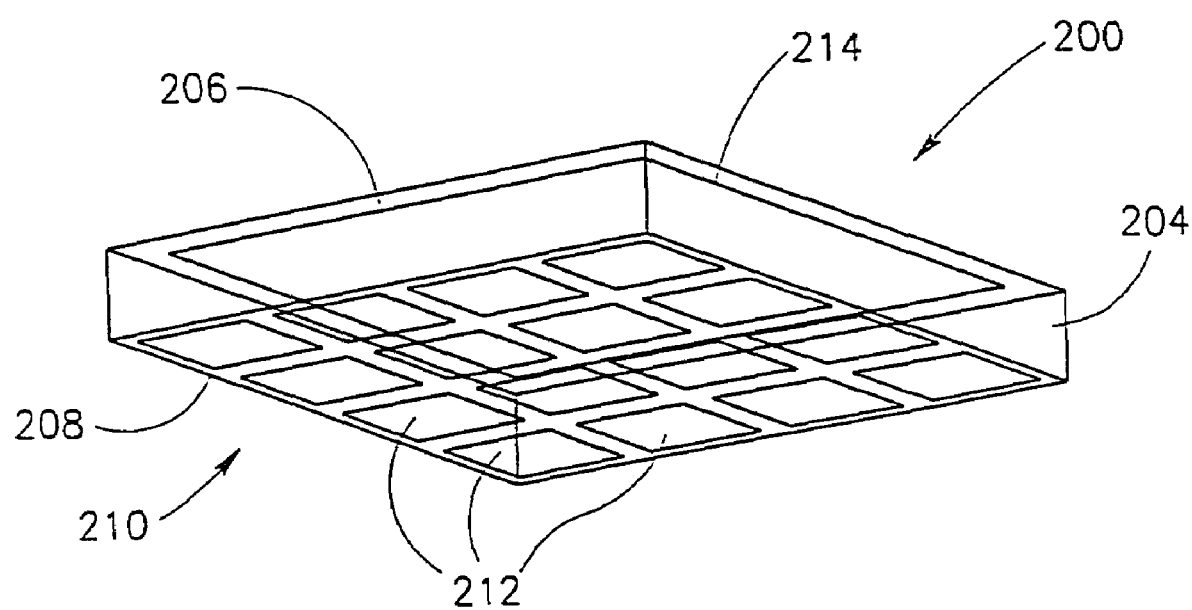
FIGS. 8A and 8B schematically show a detector plate and a multilayer detector respectively, in accordance with a preferred embodiment of the present invention.
Figure 8B:
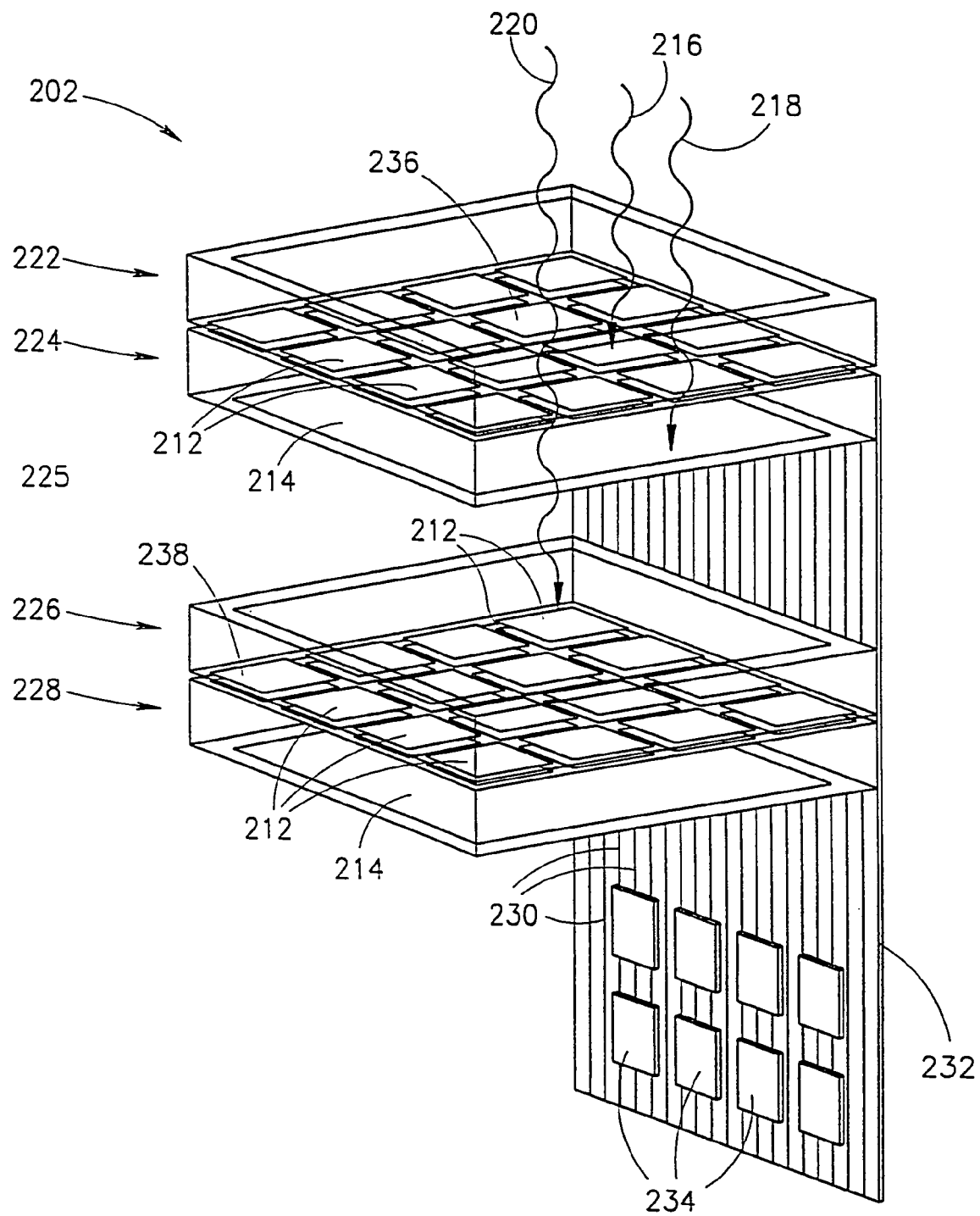

FIGS. 8A and 8B schematically show a detector plate 200 and a multilayer detector 202 interacting with photons respectively, in accordance with a preferred embodiment of the present invention.

Figure 1A:
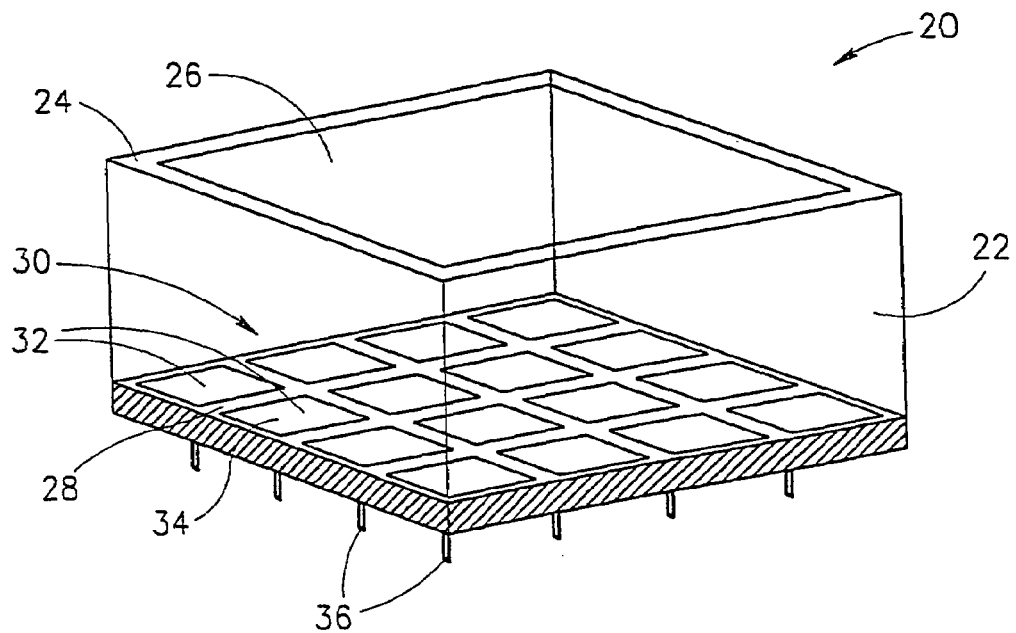
FIG. 1A shows a schematic of a pixelated semiconductor photon detector of the prior art.
Figure 1B:
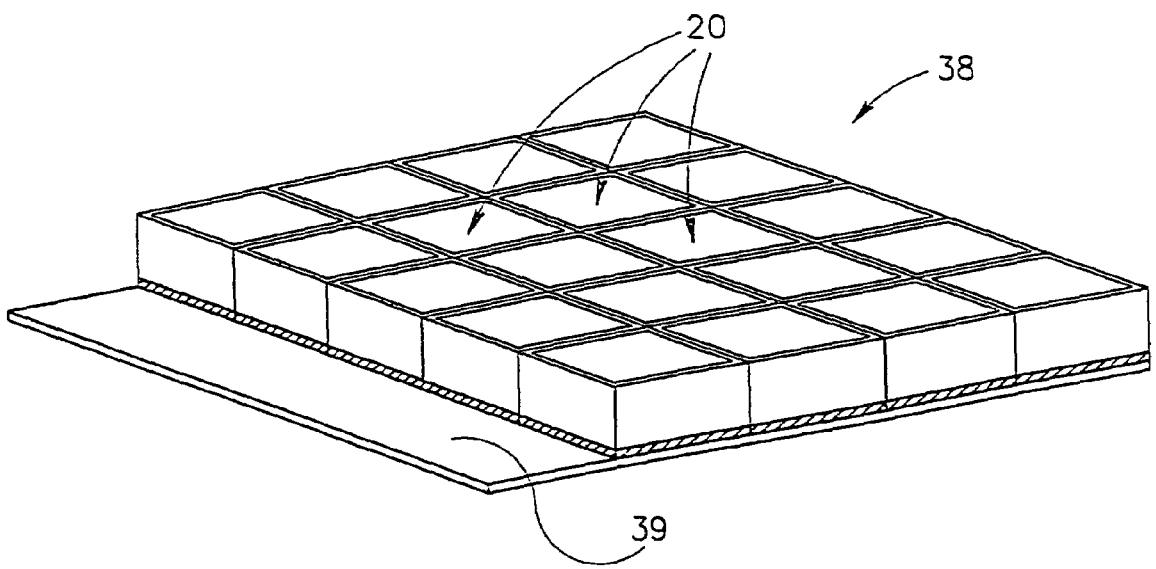
FIG. 1B schematically shows a gamma camera comprising a plurality of detectors of the type shown in FIG. 1A.

Referring to FIG. 8A, detector plate 200 preferably comprises a thin plate 204 of semiconductor material having relatively large parallel planar, preferably, square face surfaces 206 and 208 respectively. Detector plate 200 preferably has an anode electrode 210 comprising pixels 212 and a cathode electrode 214 similar to an anode electrode and a cathode electrode of one of the pixelated detectors described above. In FIG. 8A, by way of example, anode 210, pixels 212 and cathode 214, are similar to anode 30, anode pixels 32 and cathode 26 respectively, of pixelated detector 20 shown in FIG. 1A. Alternatively, the anodes and cathode are of the type described with respect to FIGS. 6 and 7.

Referring to FIG. 8B, multilayer detector 202 is shown interacting with photons represented by wavy arrows 216, 218 and 220, in accordance with a preferred embodiment of the present invention. Photons 216, 218 and 220 are shown depositing their energies in detector plates 222, 224 and 226 respectively, i.e. at the points in FIG. 4 at the tips of their respective arrowheads. In many instances, especially when a photon energy is high, the photon may deposit its energy in the detector in more than one location. For example, a photon may deposit some of its energy in one detector plate via a Compton scattering interaction and subsequently deposit the balance of its energy in a different detector plate.

Multilayer detector 202 comprises four detector plates 222, 224, 226 and 228 that are identical to detector plate 200 shown in FIG. 8A. Detector plates 222, 224, 226 and 228 are preferably parallel and accurately aligned so that a line perpendicular to the plane of detector plate 222 passing through the center of any anode pixel 212 of detector plate 222 passes substantially through the center of an anode pixel of each of detector plates 224, 226 and 228.

Preferably, detector plates 222 and 224 are substantially contiguous and detector plates 226 and 228 are substantially contiguous. Preferably, anode pixels 212 of detector plate 224 face anode pixels 212 of detector plate 224 and anode pixels 212 of detector plate 226 face anode pixels 212 of detector plate 228. A space 225 may separate detector plates 222 and 224 from detector plates 226 and 228. However, such a space, if it exists is small.

Anode pixels 212 and cathodes 214 of detector plates 222 224, 226 and 228 are preferably electrically connected to conductors 230 on a printed circuit board 232. ASICs 234 for processing signals from cathodes 214 and anode pixels 212 of multilayer detector 202 are mounted on printed circuit board 232 and electrically connected to conductors 230 at a distance from detector plates 222 224, 226 and 228, in accordance with a preferred embodiment of the present invention, as described in the discussions of FIGS. 10 and 11 below. In some embodiments of multilayer detector 202, ASICs 234 are located in space 225.

In some variations of multilayer detector 202, signals from anode pixels 212 in multilayer detector 202 that face each other (i.e., one from detector plate 222 and one from detector plate 224, or one from detector plate 226 and one from detector plate 228) are processed by ASICs 234 independently of each other. In other versions of multilayer detector 202, anode pixels that face each other are preferably connected and share a same ASIC 234, which ASIC 234 processes signals from either or both of the anode pixels 212 that face each other. In some embodiments of multilayer detector 202 one of detection plates 222 and 224 and one of detection plates 226 and 228 does not have anode pixels 212. Anode pixels 212 of the adjacent contiguous detection plates function as anode pixels 212 for the detection plates without anodes, i.e. they are the anodes for two plates.

The effective stopping power of multilayer detector 202 for incident photons is the same as that for a detector four times as thick as one of detector plates 222, 224, 226 and 228 (all are identical). If the thickness of each of detector plates 222, 224, 226 and 228 is equal to the maximum thickness at which detector crystals can be manufactured, multilayer detector 202 has several times the maximum stopping power achievable from a single crystal. Furthermore, it is obvious that the stopping power of multilayer detector 202 can be increased, in accordance with a preferred embodiment of the present invention, by increasing the number of detector plates comprised in multilayer detector 202.

Detector plates and multilayer detectors, in accordance with a preferred embodiment of the present invention, having anode pixels and cathodes that are different from those shown in FIGS. 8A and 8B are possible and advantageous. In particular, anode pixels comprising collecting and non-collecting anode combs, as shown in FIGS. 6 and 7, and as discussed above are possible and advantageous. Furthermore, whereas multilayer detector 202 is shown having four detector plates configured in two groups of two detector plates each, multilayer detectors, in accordance with preferred embodiments of the present invention, can have more or less than four detector plates in configurations that are similar to or different from that shown for multilayer detector 202. For example, a multilayer detector may be configured so that all detector plates of a plurality of detector plates in the multilayer detector are contiguous, or so that the detector plates are spaced equidistantly one from the other. Furthermore, whereas detector 202 is shown having anode pixels of adjacent contiguous detector plates facing each other, it is possible and advantageous to have cathodes of adjacent contiguous detector plates in a multilayer detector face each other. (This is of course a necessity in a multilayer detector comprising more than two detector plates in which it is desired to have like electrodes facing like electrodes). Additionally, a single cathode on one detector plate of two contiguous detector plates can function as the cathode for both of the contiguous detector plates when the cathode is located between the two contiguous detector plates. It is also possible, to have the cathode of one detector plate of two adjacent detector plates (with an appropriate space or insulation between them) face the anode of the other detector plate of the adjacent detector plates.

Energy and position for a detected photon and a timing signal for the photon are determined by appropriately processing signals from anode pixels, and/or collecting and non-collecting anodes, and cathodes as described above in the discussions relating to pixelated detectors having a single semiconductor crystal. Preferably, the outputs of corresponding electrodes from overlying crystals are summed before the timing, energy and position are determined.

Figure 9C:
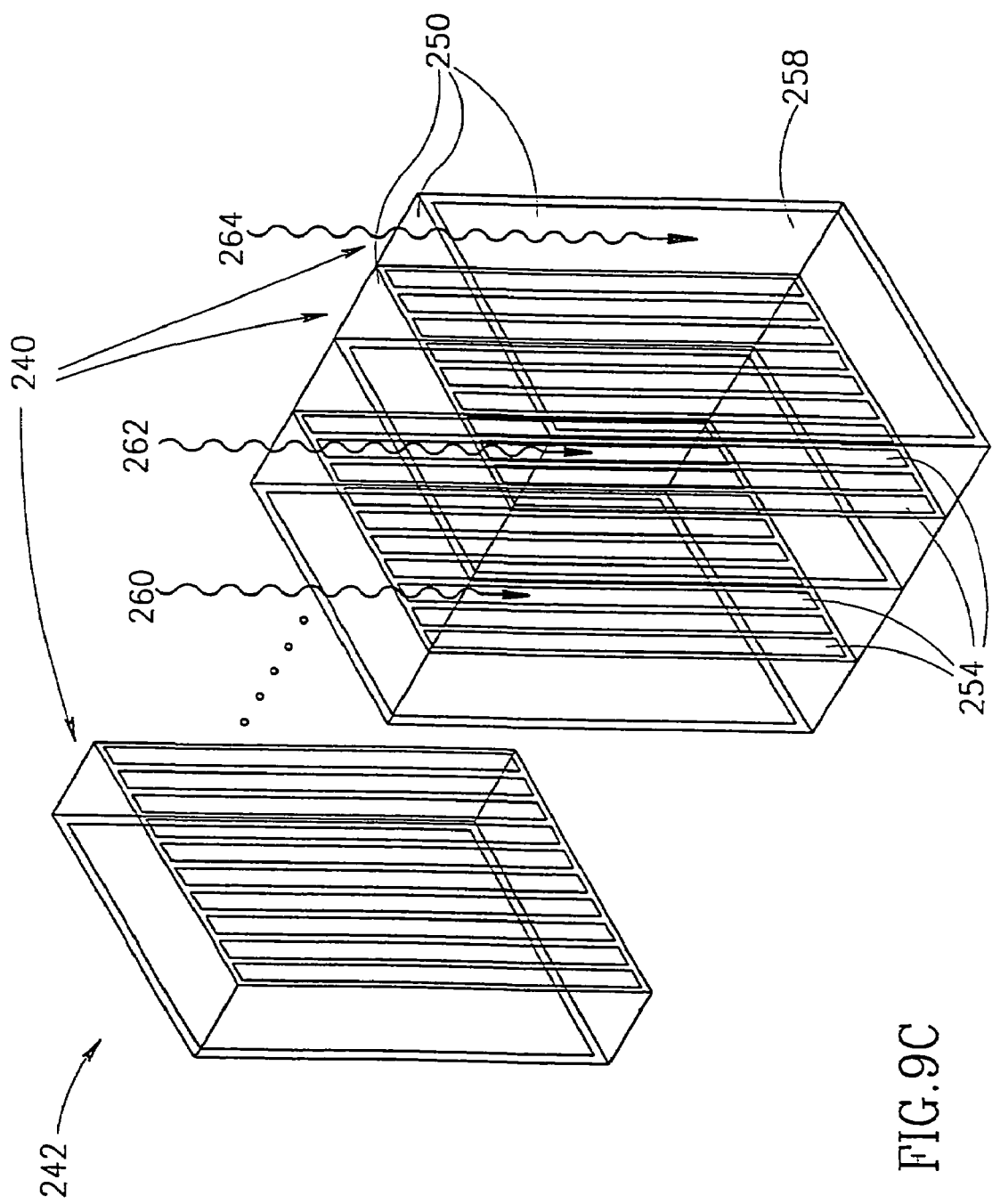
FIG. 9C schematically shows a multilayer detector formed from detector plates shown in FIGS. 9A and 9B, in accordance with a preferred embodiment of the present invention.

FIGS. 9A and 9B show two views of another detector plate 240. FIG. 9C shows a multilayer detector 242 formed from a plurality of detector plates 240, in accordance with preferred embodiments of the present invention.

Referring to FIGS. 9A and 9B, detector plate 240 comprises a thin, preferably rectangular semiconductor crystal plate 244 having relatively large parallel planar face surfaces 246 and 248 and narrow edge surfaces 250. Face surface 246 shown in FIG. 9A is covered with an anode 252 comprising a plurality of preferably identical narrow rectangular strip pixels 254 that are parallel to edges 256 of face surface 246. Preferably, strip pixels 254 have a length substantially equal to the length of edges 256 and a center to center spacing preferably equal to the thickness of crystal plate 244 or a multiple thereof. This produces substantially square pixels. Face surface 248, shown in FIG. 9B, has a cathode 258 that covers substantially all of its area.

FIG. 9C shows a multilayer detector 242 formed from a plurality of detector plates 240. Detector plates 240 are preferably stacked together with edge surfaces 250 aligned and strip anodes pixels 254 parallel. Adjacent detector plates 240 have either face surfaces 248 with cathodes 258 contiguous or face surfaces 246 with anode strip pixels 254 contiguous and strip pixels 254 overlapping substantially exactly. In variations of multilayer detector 242, each detector plate 240 in multilayer detector 242 has only a cathode 258 or only an anode 252. Each cathode 258 and each anode 252 serves two adjacent detector plates 240 in detector 242.

Multilayer detector 242 is preferably oriented so that the long edge of anode strip pixels 254 are substantially parallel to the momentum vectors of detected photons. A detected photon therefore generally deposits its energy by ionization material in a small volume of multilayer detector 242 at a point along a path substantially parallel to anode strip pixels 254. As a result, the electrons and holes produced by the ionizing interaction of the photon generate signals on at most one or a few anode strip pixels 254 and on one or at most a few cathodes 258 in multilayer detector 242. The effective stopping power of multilayer detector 242 is equivalent to the stopping power of a semiconductor crystal having a thickness equal to the length of edges 256 of detector plates 240, which length is equal to the dimension of multilayer detector 242 parallel to the momentum vectors of detected photons. Photons incident on multilayer detector 242 are schematically represented by wavy arrows 260, 262 and 264 and locations in multilayer detector 242 where they deposit their energies by ionization are represented by the tips of their respective arrowheads. As noted above photons may sometimes, for example as a result of off-normal entry or Compton scattering, deposit their energies in more than one location in multilayer detector 242.

Preferably, each anode strip pixel 254 and each cathode 258 is connected to a different charge preamplifier so that signals generated by a detected photon on anode strip pixels 254 and cathodes 258 in multilayer detector 242 are appropriately amplified.

The magnitudes of signals from anode strip pixels 254 are used to determine the location in multilayer detector 242 at which the detected photon is incident. Preferably, Anger arithmetic is used to determine the location of the detected photon with an accuracy better than a width of anode strip pixels 254 (as indeed it can be used to find the accuracy of position to an accuracy greater than the anode size for all the embodiments of the invention). The energy of the detected photon is determined from the sum of signals generated on all anode strip pixels 254. Preferably, the sum of signals from all anode strip pixels 254 is used to determine when the detected photon is incident on multilayer detector 242. Alternatively, signals from cathodes 258 are, preferably, used.

Whereas, multilayer detector 242 is shown with anode strip pixels 254 that are uniform conducting strips, in some preferred embodiments of the present invention, anode strip pixels are formed from two anode strip comb electrodes, a collecting and non-collecting anode strip comb. The collecting and non-collecting anode strip combs operate similarly to the manner in which collecting and non-collecting anode combs operate for anode pixels comprising comb anodes described above.

Figure 10:
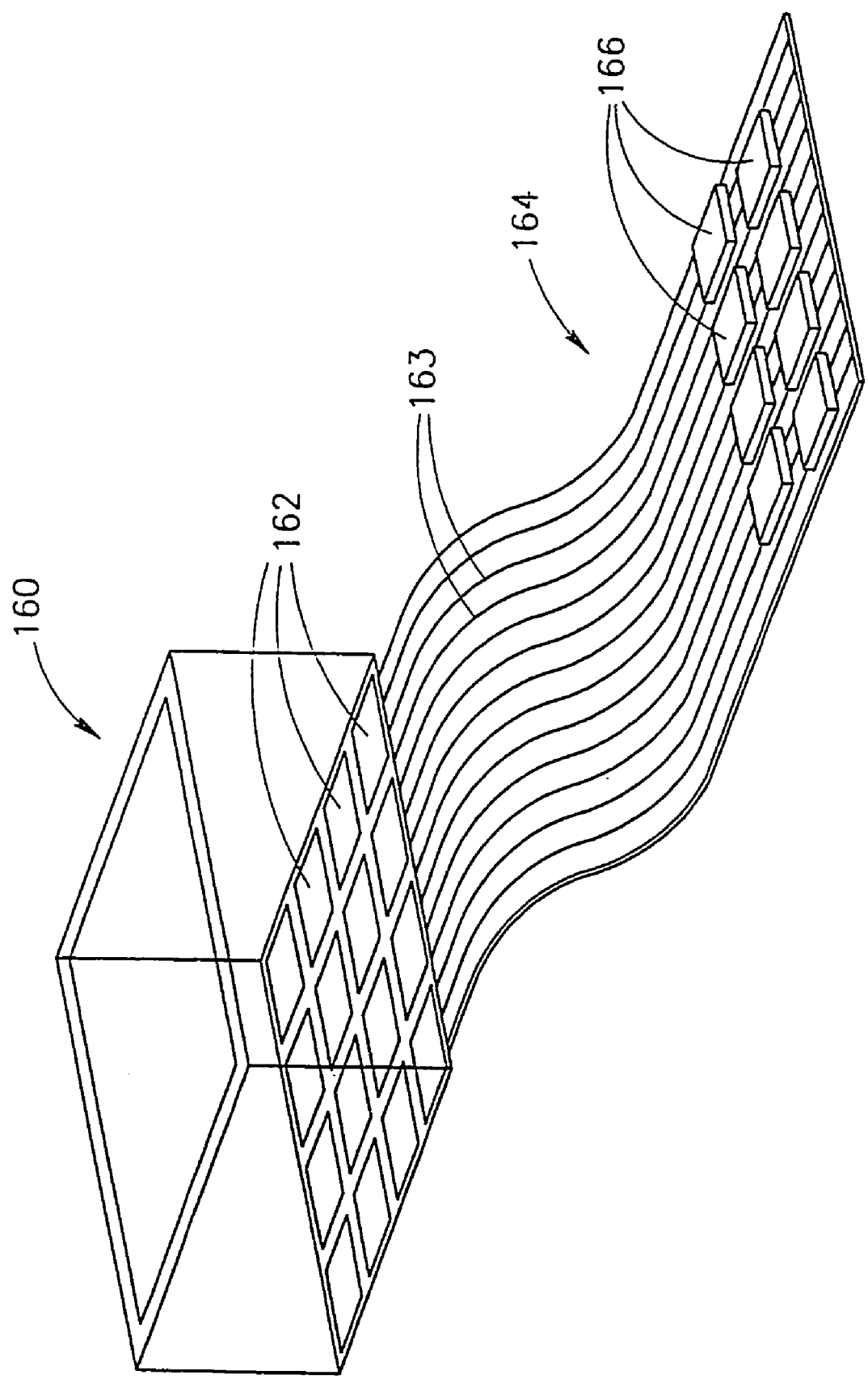
FIG. 10 schematically illustrates a pixelated semiconductor photon detector connected to ASICs in accordance with a preferred embodiment of the present invention.

FIG. 10 illustrates a method of making appropriate electrical contact between anode pixels 160 of a pixelated detector 162 and ASICs 166 used to process signals from anode pixels 160 so as to reduce heat transfer from ASICs 166 to detector 160, in accordance with a preferred embodiment of the present invention.

According to a preferred embodiment of the present invention, anode pixels 162 in detector 160 are electrically connected via conductors 163 in a length of a flexible or rigid printed circuit board 164 to ASICs 166. ASICs 166 are mounted on circuit board 164 at a distance from detector 160. By removing ASICs 166 from proximity with detector 160, heat transfer from ASICs 166 to detector 160 is reduced and air circulation around detector 160 is improved. Electrical contact between conductors 163 in printed circuit board 164, anode pixels 162 and appropriate contacts on ASICs 166 are made using methods known in the art.

Figure 11:
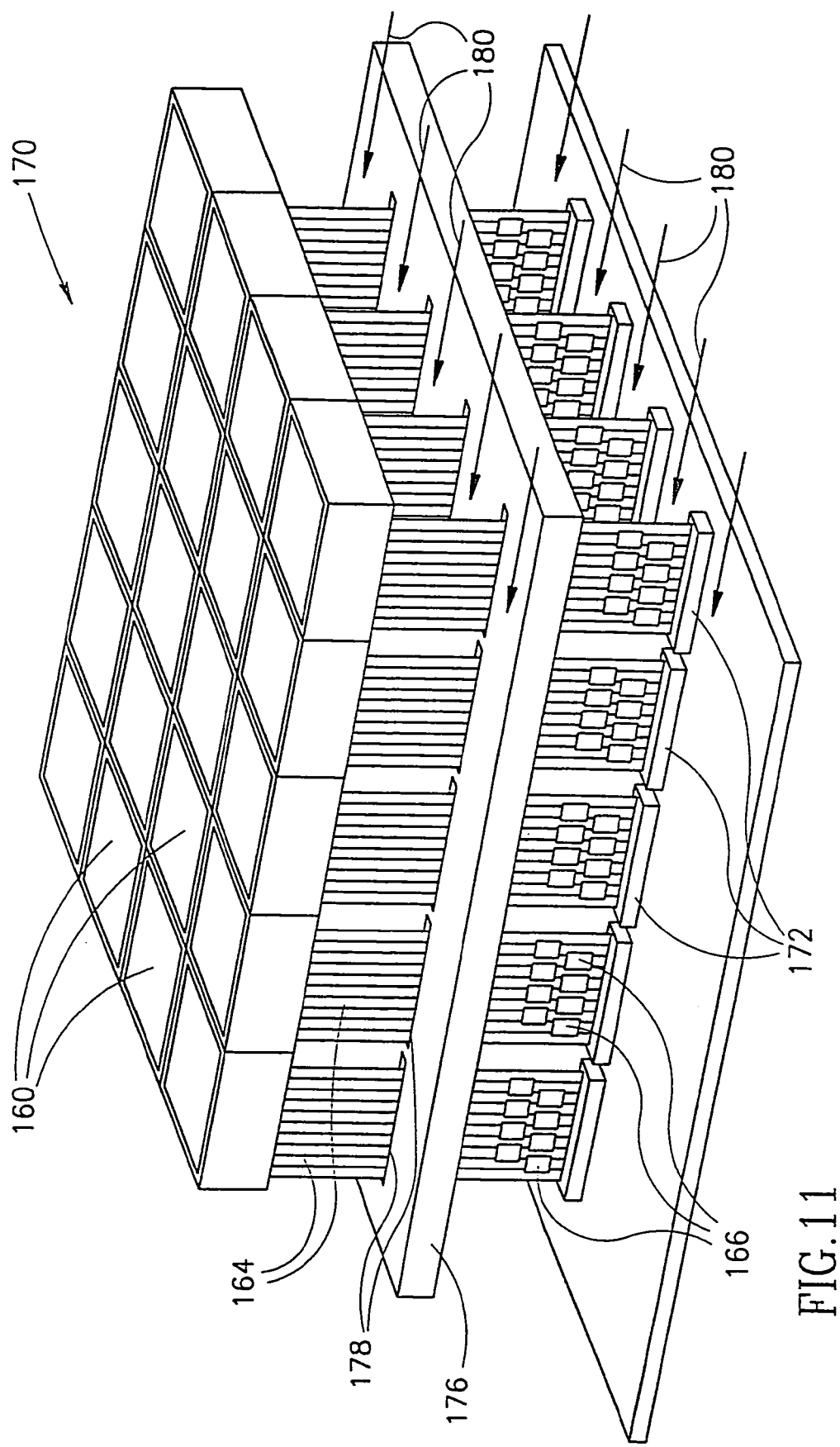
FIG. 11 schematically illustrates a gamma camera comprising a plurality of photon detectors wherein each of the detectors is connected to a ASICs and a motherboard, in accordance with a preferred embodiment of the present invention.

FIG. 11 schematically illustrates the use of connections of the type shown in FIG. 10 to enable improved cooling of pixelated detectors used in a gamma camera, in accordance with a preferred embodiment of the present invention. FIG. 11 shows schematically and not to scale a gamma camera 170 comprising a rectangular array of twenty pixelated detectors 160 wherein each detector 160 is connected to ASICs 166 via a printed circuit board 164 as shown in FIG. 10. An end 167 of each printed circuit board 164 is plugged in to an appropriate socket 172 in a motherboard 174. A layer 176 formed from insulating material is located between gamma camera 170 and motherboard 174 so that ASICs 166 and gamma camera 170 are on opposite sides of plate 176. Each printed circuit board 164 extends from its detector 160 and passes through an appropriate slot 178 in layer 176 to make connection with its socket 172.

Preferably, the insulating material from which layer 176 is formed is lightweight and pliable. Preferably, slots 178 are cut to a size so that printed circuit boards 164 fit snugly in slots 178 and air cannot flow from below insulating layer 176 to above insulating plate 176 through spaces between printed circuit boards 164 and slots 178. Preferably, air cooled to a first cooling temperature is circulated in the spaces between printed circuit boards 164 on the side of layer 176 close to gamma camera 170 along the directions indicated by arrows 180. Preferably, air cooled to a second cooling temperature is circulated through the spaces between circuit boards 164 on the side of layer 176 close to motherboard 174 along the directions indicated by arrows 181. The first and second cooling temperatures and the rates at which cooled air circulates in the directions 180 and 181 are preferably controlled to maintain temperatures of pixelated detectors 160 between ±10° C.

Means for cooling gamma 170 other than by circulating air through gamma camera 170 are also possible and advantageous. For example, a cooling system that transfers heat away from gamma camera 170 using heat pipes or a refrigerant fluid circulating in pipes can be used to cool gamma camera 170.

Whereas gamma camera 170 is shown comprising twenty pixelated detectors in a rectangular array, the number of pixelated detectors and their arrangement in a rectangular array are by way of example only. Different numbers of pixelated detectors and non-rectangular arrays are possible and advantageous.

In the claims and specification of the present application, each of the verbs, "comprise" and "include", and conjugates thereof, are used to indicate that the object or objects of the verb include but are not necessarily a complete listing of all the components, elements or parts of the subject or subjects of the verb.

The present invention has been described using non-limiting detailed descriptions of preferred embodiments thereof that are provided by way of example and are not intended to limit the scope of the invention. Variations of embodiments described will occur to persons of the art. For example, whereas signals from pixelated detectors have been described as being processed by ASICs other means for processing signals from pixelated detectors are possible and advantageous. Signals from pixelated detectors can be dumped to memory and processed directly by a computer CPU. Alternatively non-dedicated circuits such as digital or analog programmable logic devices can be used. Other means and/or combinations of means for processing signals known in the art can be used. The scope of the invention is limited only by the following claims:

What is claimed is:

1. A gamma camera comprising:
   a plurality of pixelated detectors wherein each pixelated detector provides a detector signal responsive to photons that are incident on it;
   a plurality of processing circuits that receive said detector signals and provide processed signals responsive to said detector signals; and
   at least one printed circuit board on which said plurality of pixelated detector are mounted and having conductors thereon that carry said detector signals to said processing circuits;

wherein said processing circuits are mounted on said printed circuit board at locations remote from said detectors; and wherein said plurality of pixelated detectors form a two-dimensional planar array.

2. A gamma camera according to claim 1 comprising a motherboard having conductors thereon and wherein conductors in said motherboard and conductors in said printed circuit board are in electrical contact and wherein said conductors on said motherboard carry processed signals.

3. A gamma camera according to claim 1 and including a heat-insulating material situated between said pixelated detectors and said processing circuits.

4. A gamma camera according to claim 3 wherein said heat-insulating material and said pixelated detectors are spaced apart.

5. A gamma camera according to claim 4 comprising an air circulator that circulates air in said space between said heat-insulating material and said pixelated detectors.

6. A gamma camera according to claim 3 wherein said heat-insulating material and said processing circuits are spaced apart.

7. A gamma camera according to claim 6 comprising an air circulator that circulates air in said space between said heat insulating material and said processing circuits.

8. A gamma camera according to claim 7 comprising an air cooler that cools air circulated by said air circulator.

9. A gamma camera according to claim 1 and comprising a cooling system comprising heat pipes and a means for removing heat from said heat pipes wherein said heat pipes carry heat from said gamma camera to said means for removing heat.

10. A gamma camera according to claim 1 and comprising a cooling system having a refrigerant fluid, a means for removing heat from said refrigerant fluid and a means for circulating said refrigerant fluid between said gamma camera and said means for removing heat.

11. A gamma camera according to claim 1 wherein said processing circuits are comprised in ASICs.

12. A method of connecting a two dimensional planar array of pixelated gamma ray detectors with processing circuits for processing signals from said detector comprising:

locating said processing circuits so that they are remotely situated with respect to said pixelated detector; and connecting said pixelated detectors to said processing circuits via conductors of a printed circuit board.

13. A method of protecting pixelated detectors in a gamma camera from heat radiated by processing circuits that process signals from said pixelated detectors comprising:

connecting said pixelated detectors in accordance with claim 12 so as to provide a space between said pixelated detectors and said processing circuits; and circulating air in said space.

14. A method according to claim 13 comprising positioning heat-insulating material in said space between said pixelated detectors and said processing circuits.

15. A method according to claim 14 wherein positioning heat-insulating material comprises positioning heat-insulating material so that there is a space between said heat-insulating material and said pixelated detectors.

16. A method according to claim 15 wherein circulating air comprises circulating air in a region of said space between said heat-insulating material and said pixelated detectors.

17. A method according to claim 14 wherein positioning heat-insulating material comprises positioning heat-insulating material so that there is a space between said heat-insulating material and said processing circuits.

18. A method according to claim 17 wherein circulating air comprises circulating air in a region of said space between said heat-insulating material and said processing circuits.

19. A method according to claim 13 wherein circulating air comprises cooling air and circulating cooled air.

20. A gamma camera comprising:

a plurality of pixelated detectors wherein each pixelated detector provides a detector signal responsive to photons that are incident on it, mounted on a first printed circuit board;

a plurality of processing circuits that receive said detector signals and provide processed signals responsive to said detector signals, mounted on a second printed circuit board, wherein the first and second printed circuit boards are connected to each other without an intervening cable; and wherein the first and second printed circuit boards are connected together via a socket on one of the boards.

21. A gamma camera comprising:

a plurality of pixelated detectors wherein each pixelated detector provides a detector signal responsive to photons that are incident on it, mounted on a first printed circuit board;

a plurality of processing circuits that receive said detector signals and provide processed signals responsive to said detector signals, mounted on a second printed circuit board, wherein the first and second printed circuit boards are connected to each other without an intervening cable;

and including a heat-insulating material situated between said pixelated detectors and said processing circuits.

22. A gamma camera according to claim 21 wherein said heat-insulating material and said pixelated detectors are spaced apart.

23. A gamma camera according to claim 22 comprising an air circulator that circulates air in said space between said heat-insulating material and said pixelated detectors.

24. A gamma camera according to claim 21 wherein said heat-insulating material and said processing circuits are spaced apart.

25. A gamma camera according to claim 24 comprising an air circulator that circulates air in said space between said heat insulating material and said processing circuits.

26. A gamma camera according to claim 25 comprising an air cooler that cools air circulated by said air circulator.

27. A gamma camera comprising:

a plurality of pixelated detectors wherein each pixelated detector provides a detector signal responsive to photons that are incident on it, mounted on a first printed circuit board;

a plurality of processing circuits that receive said detector signals and provide processed signals responsive to said detector signals, mounted on a second printed circuit board, wherein the first and second printed circuit boards are connected to each other without an intervening cable;

and comprising a cooling system comprising heat pipes and a means for removing heat from said heat pipes wherein said heat pipes carry heat from said gamma camera to said means for removing heat.

* * * * *